(12) United States Patent
Saitou et al.

(10) Patent No.: US 9,950,935 B2
(45) Date of Patent: Apr. 24, 2018

(54) WATER TREATMENT DEVICE AND HUMIDIFICATION DEVICE

(71) Applicant: DAIKIN INDUSTRIES, LTD., Osaka-shi, Osaka (JP)

(72) Inventors: Tomoki Saitou, Osaka (JP); Masaya Nishimura, Osaka (JP); Tsunahiro Ohdou, Osaka (JP); Sachiko Yamaguchi, Osaka (JP)

(73) Assignee: DAIKIN INDUSTRIES, LTD., Osaka-Shi (JP)

(*) Notice: Subject to any disclaimer, the term of this patent is extended or adjusted under 35 U.S.C. 154(b) by 0 days.

(21) Appl. No.: 15/512,291

(22) PCT Filed: May 19, 2015

(86) PCT No.: PCT/JP2015/002511
§ 371 (c)(1),
(2) Date: Mar. 17, 2017

(87) PCT Pub. No.: WO2016/051621
PCT Pub. Date: Apr. 7, 2016

(65) Prior Publication Data
US 2017/0267551 A1 Sep. 21, 2017

(30) Foreign Application Priority Data
Sep. 30, 2014 (JP) ................... 2014-201718

(51) Int. Cl.
*C02F 1/46* (2006.01)
*C02F 1/467* (2006.01)
(Continued)

(52) U.S. Cl.
CPC .......... *C02F 1/4608* (2013.01); *C02F 1/4618* (2013.01); *C02F 1/4672* (2013.01);
(Continued)

(58) Field of Classification Search
CPC ................. C02F 1/4672; C02F 1/46; C02F 2201/46105; C02F 2303/04;
(Continued)

(56) References Cited

U.S. PATENT DOCUMENTS

| | | | |
|---|---|---|---|
| 2012/0048792 A1* | 3/2012 | Saitou | C02F 1/4608 210/243 |
| 2013/0186748 A1 | 7/2013 | Yoon et al. | |
| 2015/0239755 A1 | 8/2015 | Nishimura et al. | |

FOREIGN PATENT DOCUMENTS

| | | |
|---|---|---|
| CN | 1153680 A | 7/1997 |
| CN | 102428034 A | 4/2012 |

(Continued)

OTHER PUBLICATIONS

International Search Report for PCT/JP2015/002511 (PCT/ISA/210) dated Aug. 25, 2015.
Extended European Search Report issued in European Application No. 15847401.5, dated Jul. 14, 2017.

*Primary Examiner* — Walter D. Griffin
*Assistant Examiner* — Cameron J Allen
(74) *Attorney, Agent, or Firm* — Birch, Stewart, Kolasch & Birch, LLP

(57) ABSTRACT

A water treatment device includes: an insulating divider which divides a space inside a water tank into two treatment vessels adjacent to each other in a horizontal direction, and includes a current carrier which is able to energize water in the two treatment vessels; a treatment unit including a pair of electrodes, a power supply, and a power supply controller; a water supplier which supplies water to each of the treatment vessels; and a draining member which drains water from each of the treatment vessels. The treatment unit includes a detector which detects a level of water in each of the treatment vessels based on an index corresponding to a current value between the pair of electrodes.

7 Claims, 19 Drawing Sheets

(51) Int. Cl.
  *C02F 1/461*    (2006.01)
  *F24F 6/04*     (2006.01)
  *F24F 6/00*     (2006.01)

(52) U.S. Cl.
  CPC .... *F24F 6/043* (2013.01); *C02F 2201/46135* (2013.01); *C02F 2201/46145* (2013.01); *C02F 2209/42* (2013.01); *C02F 2303/04* (2013.01); *C02F 2305/023* (2013.01); *F24F 2006/006* (2013.01); *F24F 2006/008* (2013.01)

(58) Field of Classification Search
  CPC .... C02F 2103/02; C02F 1/467; B01F 3/0424; B01F 2003/04943; B01F 2215/0052; B01F 2003/04886; B01F 3/04
  See application file for complete search history.

(56) References Cited

FOREIGN PATENT DOCUMENTS

| | | | |
|---|---|---|---|
| CN | 204827960 U | * | 12/2015 |
| EP | 2902369 A1 | | 8/2015 |
| JP | 2003-302075 A | | 10/2003 |
| JP | 2005-305100 A | | 11/2005 |
| JP | 2009-19833 A | | 1/2009 |
| JP | 2011-92920 A | | 5/2011 |
| JP | 2014-79734 A | | 5/2014 |
| JP | 2014-79739 A | | 5/2014 |

* cited by examiner

WATER TREATMENT DEVICE AND HUMIDIFICATION DEVICE

TECHNICAL FIELD

The present invention relates to a water treatment device and a humidifier.

BACKGROUND ART

Water treatment devices which treat water by discharge or electrolysis are known in the art. For example, Patent Document 1 discloses a water treatment device which purifies water by discharge.

A water treatment device includes a water tank, an interior space of which is divided into two treatment vessels by an insulating divider, and electrodes immersed one each in each of the treatment vessels. The divider is provided with a fine hole (discharge hole) which allows the two treatment vessels to communicate with each other. If a high voltage is applied from a power supply to the electrodes, current density at the fine hole increases as shown in FIG. 5 of Patent Document 1, and water in the fine hole is vaporized by Joule heat. As a result, a bubble is generated in the fine hole to divide the two treatment vessels from each other. In this water treatment device, an interface between water in one of the treatment vessels and the bubble and an interface between water in the other treatment vessel and the bubble function as electrodes. Then, discharge occurs from one of the interfaces of water to the other. The discharge thus occurred produces highly reactive materials (active species), such as hydroxyl radicals and hydrogen peroxide. Such active species purify or sterilize water.

CITATION LIST

Patent Document

[Patent Document 1] Japanese Unexamined Patent Publication No. 2014-079739

SUMMARY OF THE INVENTION

Technical Problem

In the above-described water treatment device, however, water to be treated may be supplied to the water tank, or treated water may be drained out of the tank. That is, a level of water in the water tank of the water treatment device may vary. Thus, if the water level falls significantly such that the electrodes are exposed to the air, the above-described discharge does not occur, and the water treatment device may substantially fail to operate. Moreover, if the water level rises significantly such that water in the water tank flows over the divider, a short circuit may occur between the two electrodes via the water thus overflowed. Also in such a case, the above-described discharge does not occur, and the water treatment device may substantially fail to operate. In addition, if the water thus overflowed gets outside the tank, leakage of current may disadvantageously occur outside the tank.

A possible solution to such a problem may be providing a water level detector (e.g., a float switch or any other suitable component) for detecting the level of water in the water tank. However, this may increase the parts count, and may eventually increase costs. Further, a sensor of a float switch or any other suitable component may break down if a high voltage is applied thereto. That is to say, it is not recommended to provide the water treatment device with such a water level detector.

In view of the foregoing, it is therefore an object of the present invention to provide a water treatment device in which the number of water level detectors in a water tank may be reduced or no water level detector is required, and a humidifier including this water treatment device.

Solution to the Problem

A first aspect of the invention is directed to a water treatment device including: a water tank (31) which stores water; an insulating divider (32) which divides a space inside the water tank (31) into two treatment vessels (37, 38) adjacent to each other in a horizontal direction, and includes a current carrier (35, 81) which is able to energize water in the two treatment vessels (37, 38); a treatment unit (60, 80) including a pair of electrodes (61, 62) arranged one each in each of the treatment vessels (37, 38), a power supply (71) which applies a voltage to the pair of electrodes (61, 62), and a power supply controller (72) which switches between an ON operation of keeping the power supply (71) ON and an OFF operation of turning the power supply (71) OFF; a water supplier (40) which supplies water to each of the treatment vessels (37, 38); and a draining member (50) which drains water from each of the treatment vessels (37, 38), wherein the treatment unit (60, 80) further includes a detector (73) which detects a level of water in each of the treatment vessels (37, 38) based on an index corresponding to a current value between the pair of electrodes (61, 62).

According to the first aspect of the present disclosure, a space inside the water tank (31) is divided into the two treatment vessels (37, 38) by the insulating divider (32), and the electrodes (61, 62) are arranged one each in each of the treatment vessels (37, 38). If the power supply controller (72) of the treatment unit (60, 80) executes the ON operation with the electrodes (61, 62) immersed in water in the respective treatment vessels (37, 38), the power supply (71) is kept ON, and a voltage is applied from the power supply (71) to the electrodes (61, 62). Thus, a desired water treatment (discharge treatment or electrolysis treatment) is performed. If the power supply controller (72) executes the OFF operation, the power supply (71) is turned OFF, and the water treatment is stopped.

The water supplier (40) supplies water to each of the treatment vessels (37, 38). Further, the draining member (50) drains water from each of the treatment vessels (37, 38). Consequently, the level of water in each of the treatment vessels (37, 38) varies depending on an operational state. That is, in the water treatment device, the water level may become significantly low such that the electrodes (61, 62) are exposed in the air, or may significantly rise such that water in the treatment vessels (37, 38) overflows the divider (32).

To cope with such disadvantages, the detector (73) of the treatment unit (60, 80) detects the level of water in each of the treatment vessels (37, 38) based on an index corresponding to a current value between the pair of electrodes (61, 62). The "index corresponding to a current value between the pair of electrodes (61, 62)" is an index substantially representing the current value between the pair of electrodes (61, 62), such as a current value of a current path between the power supply (71) and the electrodes (61, 62), a potential difference (a voltage value) between the electrodes (61, 62), a value of resistance between the electrodes (61, 62), or values indirectly representing these indices. In any case, detection and calculation of the index by the detector (73) makes it possible to see how much current is flowing between the pair of electrodes (61, 62).

For example, suppose that the level of water in each of the treatment vessels (37, 38) becomes significantly low such that at least one of the electrodes (61, 62) is exposed in the air. In this case, no current flows between the pair of electrodes (61, 62), and no normal treatment is performed. Thus, detecting this situation by the detector (73) makes it possible to determine that the level of water in each of the treatment vessels (37, 38) is lower than the level of the electrodes (61, 62).

Further, for example, suppose that the level of water in each of the treatment vessels (37, 38) rises significantly thus causing water in the treatment vessels (37, 38) to overflow the divider (32). In this case, a short circuit occurs between the pair of electrodes (61, 62) via the water thus overflowed, and a current value between the pair of electrodes (61, 62) suddenly increases, or a voltage (potential difference) between the pair of electrodes (61, 62) becomes almost zero. Thus, detecting this situation by the detector (73) makes it possible to determine that the level of water in the treatment vessels (37, 38) has exceeded the level of the divider (32).

A second aspect of the present disclosure is an embodiment of the first aspect of the present disclosure. According to the second aspect, during the ON operation, the power supply controller (72) is configured to continue the ON operation if the detector (73) detects that the current value between the pair of electrodes (61, 62) lies within a predetermined normal range, and execute the OFF operation if the detector (73) detects that the current value between the pair of electrodes (61, 62) is out of the normal range.

According to the second aspect of the present disclosure, if the detector detects, during the ON operation performed by the power supply controller (72), that the current value between the pair of electrodes (61, 62) lies within a normal range based on the index, the power supply controller (72) continues the ON operation. That is, the current value between the pair of electrodes (61, 62) falling within the normal range indicates that the level of water in each of the treatment vessels (37, 38) is not significantly low and that the electrodes (61, 62) are not exposed in the air, or alternatively, the level of water in each of the treatment vessels (37, 38) does not exceed the level of the divider (32). Thus, in this case, the ON operation continues, and the treatment unit (60, 80) keeps performing the normal operation.

On the other hand, if the detector (73) detects based on the index, during the ON operation performed by the power supply controller (72), that the current value between the pair of electrodes (61, 62) is out of the normal range, the power supply controller (72) switches from the ON operation to the OFF operation. That is, the current value between the pair of electrodes (61, 62) being out of the normal range indicates that the level of water in each of the treatment vessels (37, 38) is significantly low such that the electrodes (61, 62) are exposed in the air, or alternatively, that the level of water in each of the treatment vessels (37, 38) exceeds the level of the divider (32). Thus, in this case, the power supply controller (72) switches from the ON operation to the OFF operation. This may quickly prevent the power supply (71) from being kept ON improperly in spite of the normal operation not being able to be performed.

A third aspect of the present disclosure is an embodiment of the first or second aspect of the present disclosure. According to the third aspect, the water supplier (40) includes a water supply pipe (41), and a switch (45, 46) which switches between a water supply operation of supplying water through the water supply pipe (41) and a stop operation of stopping the water supply operation, the water supplier (40) being configured to perform the water supply operation only during the OFF operation among the ON and OFF operations.

According to the third aspect of the present disclosure, the switch (45, 46) of the water supplier (40) switches between the water supply operation of supplying water into the water tank water tank (31) through the water supply pipe (41) and the stop operation of stopping the water supply operation. The water supplier (40) performs the water supply operation only during the OFF operation in which the power supply (71) is turned OFF. The water supply operation is inhibited during the ON operation in which the power supply (71) is ON (the stop operation is performed).

If the ON operation is performed during the water supply operation, water in each of the treatment vessels (37, 38) and water supplied to each of the treatment vessels (37, 38) are electrically connected. Thus, a short circuit may possibly occur between the electrodes (61, 62) in the treatment vessels (37, 38) via the water supply pipe (41). In contrast, since the water supplier (40) does not allow the water supply operation during the ON operation, such a short circuit may be effectively prevented.

A fourth aspect of the present disclosure is an embodiment of the third aspect of the present disclosure. According to the fourth aspect, the power supply controller (72) is configured to perform, after the OFF operation, a short-term ON operation of keeping the power supply (71) ON for a shorter time than the ON operation, execute the ON operation if the detector (73) detects during the short-term ON operation that the current value between the pair of electrodes (61, 62) lies within a predetermined normal range, and continue the OFF operation if the detector (73) detects during the short-term ON operation that the current value between the pair of electrodes (61, 62) is out of the normal range.

According to the fourth aspect of the present disclosure, the short-term ON operation is performed after the OFF operation, and the detector (73) determines the water level during the short-term ON operation. During the short-term ON operation, the power supply (71) is kept ON for a substantially shorter time than during the normal ON operation. Specifically, if the detector (73) merely detects the level of water based on an index corresponding to the current value, there is no need to keep the power supply (71) ON for an excessively long time, and it is sufficient to keep the power supply (71) ON for a period during which the water level can be detected. Consequently, the short-term ON operation is suitably performed for a minimum amount of time during which the detector (73) can detect the level of water in the treatment vessels (37, 38).

If the current value between the pair of electrodes (61, 62) lies within the normal range during the short-term ON operation, it is determined that the water level is also in the normal range, and then the short-term ON operation is switched to the ON operation. On the other hand, if the current value is out of the normal range during the short-term ON operation, it is determined that the water level is significantly low or high, and the OFF operation continues.

A fifth aspect of the present disclosure is an embodiment of the fourth aspect of the present disclosure. According to the fifth aspect, the water supplier (40) is configured to temporarily perform the water supply operation if the detector (73) detects during the short-term ON operation that the current value between the pair of electrodes (61, 62) is out of the normal range and no current flows between the pair of electrodes (61, 62).

According to the fifth aspect of the present disclosure, if it is detected during the short-term ON operation that the current value between the pair of electrodes (61, 62) is out of the normal range and no current flows between the pair of electrodes (61, 62), it may be determined that at least one of the pair of electrodes (61, 62) is exposed in the air due to the low level of water. Thus, if the detector (73) detects this situation, the water supplier (40) temporarily performs the water supply operation. This raises the level of water in each of the treatment vessels (37, 38).

A sixth aspect of the present disclosure is an embodiment of the fourth or fifth aspect of the present disclosure. According to the sixth aspect, the draining member (50) is configured to gradually drain water from each of the treatment vessels (37, 38) at all times, and the water supplier (40) is configured to perform the stop operation if the detector (73) detects during the short-term ON operation that the current value between the pair of electrodes (61, 62) is out of the normal range and a current is flowing between the pair of electrodes (61, 62).

According to the sixth aspect of the present disclosure, if it is detected during the short-term ON operation that the current value between the pair of electrodes (61, 62) is out of the normal range and a current is flowing between the pair of electrodes (61, 62), it may be determined that the water level is significantly high and the water is overflowing the divider (32) thus causing a short circuit. Thus, if the detector (73) detects this situation, the water supplier (40) performs the stop operation. Since the draining member (50) gradually drains water from the treatment vessels (37, 38) during the stop operation, the level of water in the treatment vessels (37, 38) may be lowered during this period.

A seventh aspect of the present disclosure is an embodiment of the fifth or sixth aspect of the present disclosure. According to the seventh aspect, the detector (73) is configured to repeat the short-term ON operation until the detector (73) detects during the short-term ON operation that the current value between the pair of electrodes (61, 62) lies within the normal range, and determine whether or not the current value between the pair of electrodes (61, 62) lies within the normal range every time the short-term ON operation is performed.

According to the seventh aspect of the present disclosure, if the current value between the pair of electrodes (61, 62) is out of the normal range and the water level is significantly low after the short-term ON operation has been performed, the water supply operation is temporarily performed to raise the water level. If the water level is significantly high, the stop operation is performed to lower the water level. Then, the current value detected by the detector (73) approaches the normal range. If the short-term ON operation and the determination by the detector (73) are repeated, and the current value detected by the detector (73) falls within the normal range, the power supply controller (72) continues the normal power-ON operation to keep the power supply ON. Thus, a desired water treatment may be resumed under normal water level conditions.

An eighth aspect of the present disclosure is an embodiment of any one of the first to seventh aspects of the present disclosure. According to the eighth aspect, a tapered portion (32a) which is tapered upward is formed at an upper end of the divider (32).

According to the eighth aspect of the present disclosure, the tapered portion (32a) is formed at the upper end of the divider (32). If the upper end of the divider (32) is horizontally flat, water easily remains on the flat upper end of the divider (32) due to surface tension, which results in poor drainage from the upper end. Thus, if the level of water in the water tank (31) comes close to the upper end of the divider (32), water adhered to the upper end of the divider (32) may cause a short circuit between the two electrodes (61, 62), or lead to abnormal discharge.

In contrast, if the tapered portion (32a) is formed at the upper end of the divider (32), the surface tension at the upper end of the divider (32) decreases, which allows remaining water to flow downward by its own weight. This improves drainage from the upper end of the divider (32), and the short circuit and abnormal discharge described above may be effectively prevented.

According to a ninth aspect of the present disclosure, the water treatment device further includes: a drain pipe (57) provided only for one treatment vessel (37) of the two treatment vessels (37, 38), and includes an inlet (57a) located in the treatment vessel (37) between a lower end of the electrode (61) and an upper end of the divider (32) and an outlet (57b) located under the water tank (31); and a sump (18) which collects water flowing from the outlet (57b) of the drain pipe (57).

According to the ninth aspect of the present disclosure, the drain pipe (57) is provided only for one treatment vessel (37). The inlet (57a) of the drain pipe (57) is at a level higher than the lower end of the electrode (61) in the corresponding treatment vessel (37). Thus, the electrode (61) is not exposed in the air even if water flows into the drain pipe (57). Further, the outlet (57a) of the drain pipe (57) is at a level lower than the upper end of the divider (32). Thus, if the level of water in the treatment vessel (37) comes close to the upper end of the divider (32), water in the treatment vessel (37) flows into the inlet (57a) of the drain pipe (57). This may substantially prevent water in the treatment vessel (37) from overflowing the divider (32).

Water that flowed through the inlet (57a) of the drain pipe (57) is collected in the sump (18). If such a drain pipe (57) is provided for each of the treatment vessels (37, 38), water flows into the sump (18) through two drain pipes. Then, in the water treatment device, water flowing through the drain pipes and water stored in the sump (18) are electrically connected, which may possibly cause a short circuit between the pair of electrodes (61, 62). In contrast, according to the present invention, the drain pipe (57) is provided only for one treatment vessel (37). Thus, such a short circuit may be effectively prevented from occurring.

A tenth aspect of the present disclosure is an embodiment of any one of the first to ninth aspects of the present disclosure. According to the tenth aspect, the current carrier is comprised of a small hole (35) which allows the two treatment vessels (37, 38) to communicate with each other, and the treatment unit is comprised of a discharge unit (60) which causes discharge inside the small hole (35).

According to the tenth aspect of the present disclosure, the current carrier of the divider (32) is comprised of the small hole (35), and the treatment unit constitutes the discharge unit (60). Specifically, if the power supply is turned ON with the water level within the normal range, the power supply (71) applies a high voltage to the pair of electrodes (61, 62). As a result, current density increases in the small hole (35), and water in the small hole (35) is vaporized by Joule heat. As a result, a bubble is generated to fill the small hole (35). An interface between water in one of the treatment vessels (37, 38) and the bubble and an interface between water in the other treatment vessel and the bubble constitute pseudoelectrodes. Thus, discharge occurs within the bubble, which produces hydroxyl radicals and hydrogen peroxide. These highly reactive materials (also referred to as active species) purify or sterilize water.

An eleventh aspect of the present disclosure is an embodiment of the tenth aspect of the present disclosure. According to the eleventh aspect, a lower end of each of the pair of electrodes (61, 62) is at a level higher than an upper end of the small hole (35).

According to the eleventh aspect of the present disclosure, the lower end of each of the electrodes (61, 62) is at a level relatively higher than the upper end of the small hole (35). Suppose that the level of water in the water tank (31) is slightly higher than the lower end of the small hole (35) and the ON operation is performed with the electrodes (61, 62) immersed in water. In this case, the electrodes (61, 62) are energized via a small amount of water on the lower end of the small hole (35). As a result, current density of the water significantly increases, which results in malfunctions such as excessive heating of the water and its vicinity, and the occurrence of abnormal discharge.

In contrast, since the lower ends of the electrodes (61, 62) are at a level higher than the upper end of the small hole (35), the electrodes (61, 62) are not immersed in water even if the level of water in the water tank (31) is slightly higher than the lower end of the small hole (35). That is, in this state, energization of the pair of electrodes (61, 62) is automatically stopped. Therefore, the above-described malfunctions do not occur.

A twelfth aspect of the present disclosure is directed to a humidifier, including: a passage forming member (11) which forms an air passage (S); and the water treatment device (30) of any one of the first to eleventh aspects of the present disclosure, wherein the draining member of the water treatment device (30) includes a water absorbing member (50) including an immersed portion (54) immersed in water in each of the treatment vessels (37, 38), and a desorbing portion (55) arranged in the air passage (S).

In the humidifier according to the twelfth aspect of the present disclosure, air flows through the air passage (S) formed by the passage forming member (11). The draining member of the water treatment device (30) according to any one of the first to eleventh aspects of the present disclosure includes the water absorbing member (50). That is, water treated by the water treatment device (30) is absorbed into the water absorbing member (50) via the immersed portion (54), and penetrates the desorbing portion (55). The desorbing portion (55) releases treated water into the air flowing through the air passage (S). In this way, the air is humidified.

Advantages of the Invention

According to the first aspect of the present disclosure, the pair of electrodes (61, 62) of the discharge unit (60, 80) is used to detect the level of water in the water tank (31). This may reduce the number, or eliminate the need, of other water level detectors such as a float switch or any other suitable component, which contributes to reduction of parts count, and to cutting down the costs. Further, unlike the float switch or any other suitable component, the water level detector, which is comprised of the pair of electrodes (61, 62), does not break down even if a high voltage is applied thereto. This may ensure the reliability of a water level adjusting function of the water treatment device.

According to the second aspect of the present disclosure, detecting whether or not the current value between the pair of electrodes (61, 62) falls within the normal range makes it possible to quickly determine whether or not the water level is lower than the level of the electrodes (61, 62), or whether or not water in the treatment vessels (37, 38) is overflowing the divider (32). Thus, in case of abnormality, the power supply (71) can be immediately turned OFF. This may prevent the power supply (71) from being kept ON improperly, and ensure safety under conditions where a normal operation cannot be performed.

Further, the power supply (71) is reliably turned OFF also in the case where water overflows the water tank (31). This may avoid leakage of current to peripheral devices outside the water tank (31), and ensure the reliability of the water treatment device.

According to the third aspect of the present disclosure, the power-ON operation is inhibited during the water supply operation performed by the water supplier (40). This may effectively prevent a short circuit from occurring between the pair of electrodes (61, 62) via water supplied into the respective treatment vessels (37, 38) through the water supply pipe (41).

According to the fourth aspect of the present disclosure, since the water level is detected during the short-term ON operation performed for a shorter time than the normal ON operation, it may quickly be determined whether the level of water is abnormal without keeping the power supply (71) ON for an excessively long time. Thus, if the water level is abnormal, the device may be quickly shifted to the OFF operation.

According to the fifth aspect of the present disclosure, if the current value between the pair of electrodes (61, 62) is out of the normal range and no current flows between the electrodes (61, 62) during the short-term ON operation, the water supplier (40) temporarily supplies water. This may bring the water level, which is significantly low, closer to the normal range.

According to the sixth aspect of the present disclosure, if the current value between the pair of electrodes (61, 62) is out of the normal range and a current is flowing between the electrodes (61, 62) during the short-term ON operation, the stop operation is performed, and the draining member (50) gradually drains water. This may bring the water level, which is significantly high, closer to the normal range.

According to the seventh aspect of the present disclosure, the short-term ON operation and the determination of the water level by the detector (73) are repeated until the current value between the pair of electrodes (61, 62) falls within the normal range. Therefore, the level of water may reliably converge to the normal range.

According to the eighth aspect of the present disclosure, the tapered portion (32*a*) is formed at the upper end of the divider (32). This improves drainage from the upper end of the divider (32) and insulation properties, thereby reducing leak current, and preventing abnormal discharge.

According to the ninth aspect of the present disclosure, the drain pipe (57) is provided only for one treatment vessel (37) of the two treatment vessels (37, 38). This may prevent the level of water from exceeding the level of the divider (32). Unlike the case where the drain pipe (57) is provided for each of the treatment vessels (37, 38), a short circuit does not occur between the pair of electrodes (61, 62) via the drain pipe (57) and water in the sump (18). Moreover, if the drain pipe (57) is provided only for one treatment vessel (37), the level of water in the treatment vessel (37) corresponding to the drain pipe (57) tends to be lower than the level of water in the other treatment vessel (38). That is, the two treatment vessels (37, 38) of the water tank (31) show an increased water level difference. This increases a creepage distance between surfaces of water in the treatment vessels (37, 38) of the water tank (31) measured along the surface of the divider (32). As a result, the creepage distance between the surfaces of water in the two treatment vessels (37, 38) is ensured even under the condition where the level of water in the water tank (31) is relatively high. Thus, time required to return to the normal operation may be shortened.

According to the tenth aspect of the present disclosure, the current carrier of the divider (32) is comprised of the small hole (35). Thus, a bubble is generated to fill the small hole (35), and discharge may be generated within the bubble. As a result, materials produced by the discharge, i.e., active species, purify and sterilize water.

According to the eleventh aspect of the present disclosure, if the level of water is near the lower end of the small hole (35), the pair of electrodes (61, 62) may be effectively prevented from being energized, which may effectively prevent abnormal discharge from occurring.

According to the twelfth aspect of the present disclosure, provided is a humidifier including a water treatment device which requires only a few (or no) water level detectors such as a float switch or any other suitable components.

DESCRIPTION OF EMBODIMENTS

Figure 1:
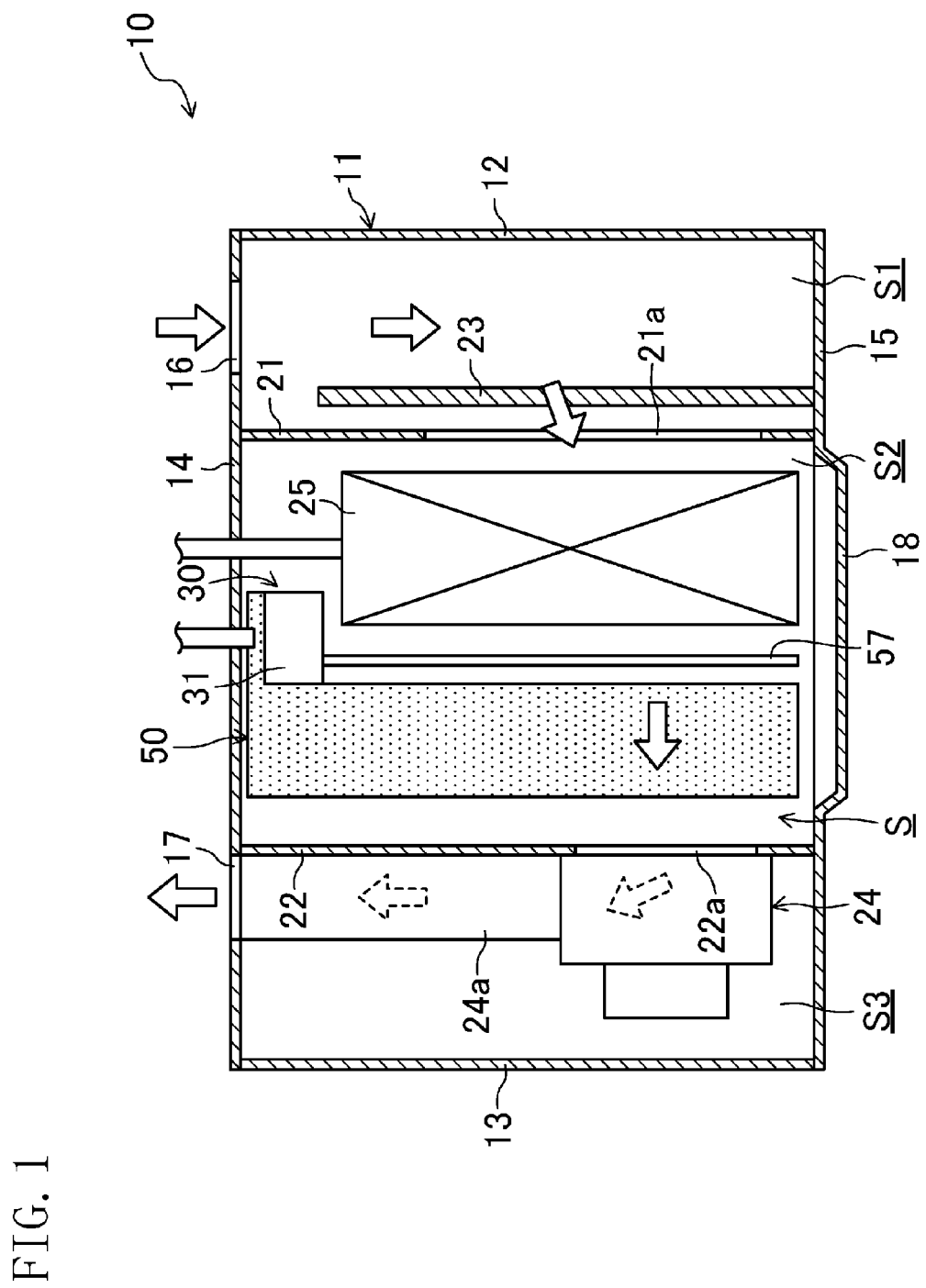
FIG. 1 is a schematic configuration diagram illustrating an air conditioner according to an embodiment.

Embodiments of the present invention will be described in detail below with reference to the drawings. The embodiments to be described below are merely exemplary ones in nature, and do not intend to limit the scope of the present invention or application or uses thereof.

A water treatment device (30) according to the present invention is installed in an air conditioner (10) which conditions the air. This air conditioner (10) constitutes a humidifier for humidifying the air. The air conditioner (10) is comprised of a so-called air handling unit which treats air sucked through a duct, and supplies the treated air into a room through a duct.

<General Configuration for Air Conditioner>

A general configuration for the air conditioner (10) will be described with reference to FIG. 1. The air conditioner (10) includes a box-like casing (11) in the form of a rectangular parallelepiped. The casing (11) includes a first side plate (12), a second side plate (13), a top plate (14), and a bottom plate (15). The first side plate (12) is arranged on an upstream side of the casing in an air flow direction (right in FIG. 1), and the second side plate (13) is arranged on a downstream side of the casing in the air flow direction (left in FIG. 1). The top plate (14) is provided with an air inlet (16) closer to the first side plate (12), and an air outlet (17) closer to the second side plate (13). Ducts (not shown) are connected to the air inlet (16) and the air outlet (17), respectively. A drain pan (18) which is dished downward is integrally formed in a center portion of the bottom plate (15). The drain pan (18) constitutes a sump which collects water flowing down from a heat exchanger (25) and/or humidifying elements (50). The drain pan (18) is grounded (see FIG. 3). Note that the drain pan (18) may be integral with, or independent from, the casing (11).

The casing (11) constitutes a passage forming member which forms an air passage (S) through which air flows. A first divider plate (21) and a second divider plate (22), both of which are longitudinal plates, are provided inside the casing (11). The first divider plate (21) is closer to the first side plate (12), and the second divider plate (22) is closer to the second side plate (13). An air supply chamber (S1) is formed between the first side plate (12) and the second divider plate (21). An air conditioning chamber (S2) is formed between the first and second divider plates (21) and (22). An air exhaust chamber (S3) is formed between the second divider plate (22) and the second side plate (13). A first vent (21*a*) is formed in a vertical center portion of the first divider plate (21), and a second vent (22*a*) is formed in a lower portion of the second divider plate (22).

A filter (23) which traps dusts and other particles in the air is provided in the air supply chamber (S1). A prefilter with a lower dust collection efficiency than the filter (23) may be arranged upstream of the filter (23).

An exhaust fan (24) is arranged in the air exhaust chamber (S3). The exhaust fan (24) may be a sirocco fan, for example, and has a suction port connected to the second vent (22*a*). A blow-off nozzle (24*a*) extending upward is connected to a discharge port of the exhaust fan (24), and an outlet end of the blow-off nozzle (24*a*) is connected to the air outlet (17).

The air conditioning chamber (S2) houses the heat exchanger (25) and the water treatment device (30). The heat exchanger (25) is comprised of a direct expansion coil into which hot and cold water are alternately supplied. That is, in the heat exchanger (25), air is heated by hot water flowing through a heat exchanger tube, or cooled by cold water flowing through the heat exchanger tube.

The water treatment device (30) includes a water tank (31) arranged in an upper portion of the air conditioning chamber (S2), and a plurality of humidifying elements (50), most of which are arranged downstream of the heat exchanger (25). The humidifying elements (50) are made of a water absorbing member having water absorbing properties. Each of the humidifying elements (50) includes an immersed portion (54) immersed in water in the water tank (31), and a desorbing portion (55) located in the air passage (S). Specifically, in the humidifying elements (50), water absorbed into the immersed portion (54) penetrates the desorbing portion (55), and the water thus penetrated the desorbing portion (55) evaporates, and is released, into the air. Thus, the air is humidified in the air conditioning chamber (S2). That is, the humidifying elements (50) comprise a draining member which gradually drains water from the water tank (31).

An overflow pipe (57) is provided in the air conditioning chamber (S2). The overflow pipe (57) allows an excess of water in the water tank (31) to be drained into the drain pan (18).

<Detailed Configuration of Water Treatment Device>

The water treatment device (30) according to the present embodiment will be described in detail with reference to FIGS. 2-5. The water treatment device (30) is configured to purify and sterilize water by discharge. The water treatment device (30) includes a water tank (31), a divider (32), a water supply unit (40), humidifying elements (50), an overflow pipe (57), and a discharge unit (60).

(Water Tank)

Figure 2:
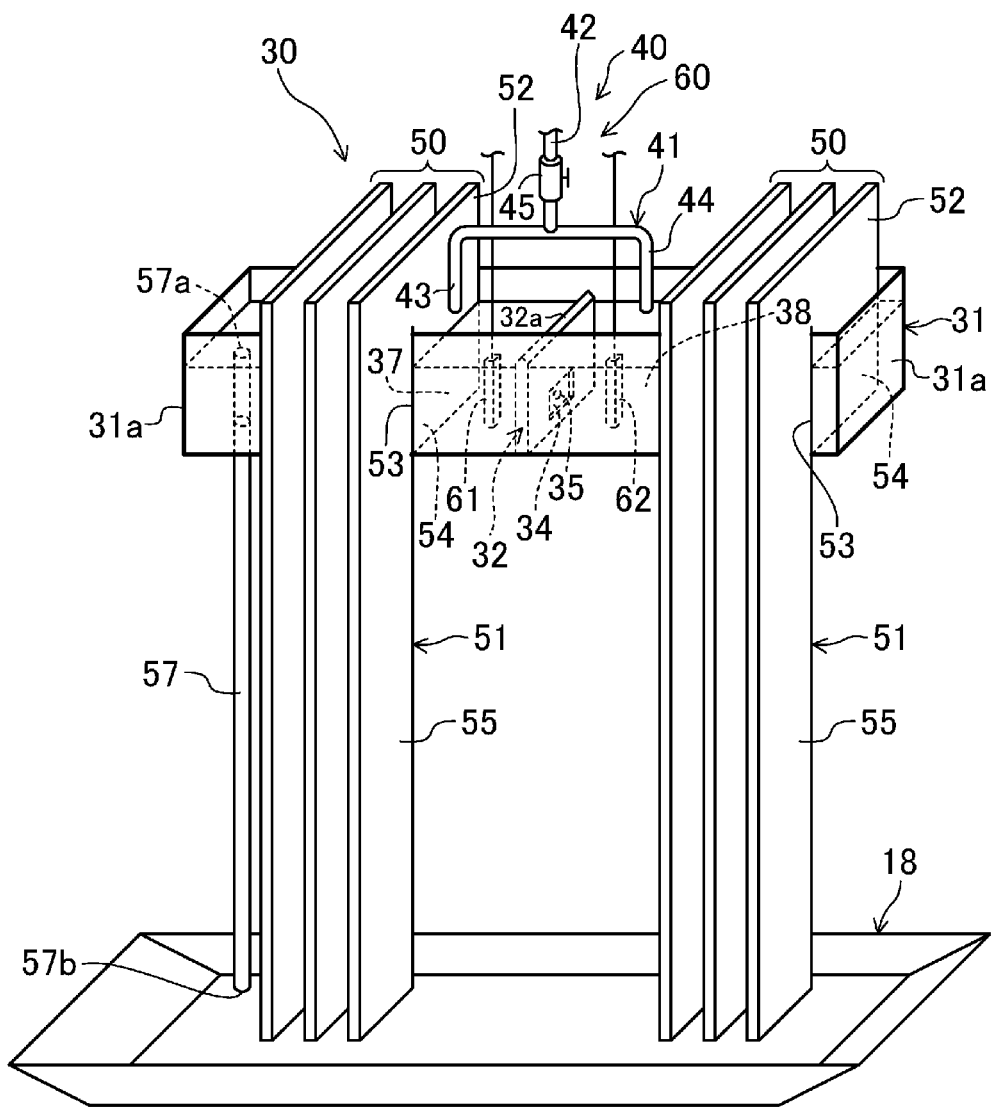
FIG. 2 is a perspective view illustrating a schematic configuration for a water treatment device.

The water tank (31) has the shape of a rectangular parallelepiped with an open top. The water tank (31) is horizontally oriented as shown in FIG. 2. The water tank (31) is made of an insulating resin material, for example, and stores water supplied from the water supply unit (40) (water supplier).

(Divider)

Figure 3:
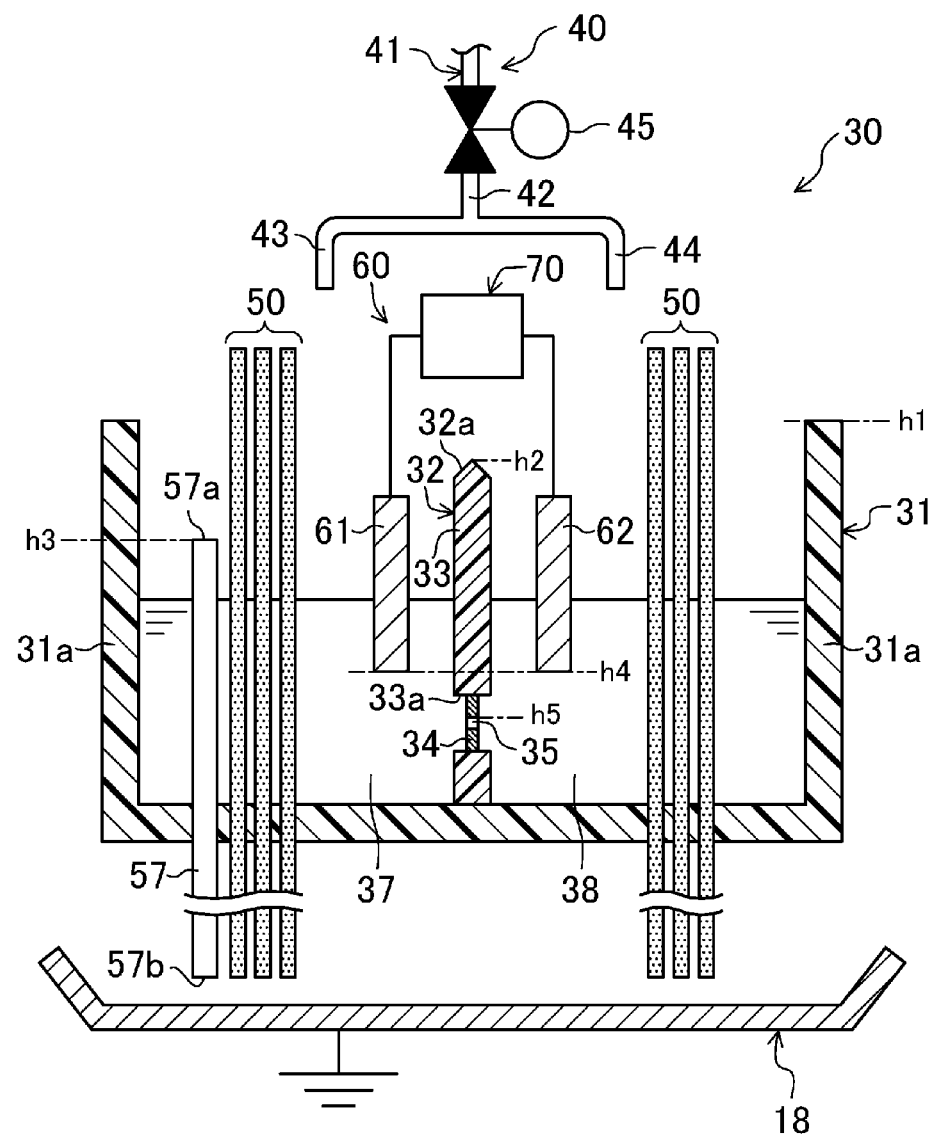
FIG. 3 is a vertical cross-sectional view illustrating a schematic configuration for the water treatment device.

As shown in FIGS. 2 and 3, the divider (32) is a substantially rectangular plate extending in a vertical direction, and is arranged at a horizontal center portion of the water tank (31). Specifically, the divider (32) divides the water tank (31) into right and left spaces. That is, the divider (32) divides a space inside the water tank (31) into two treatment vessels (37, 38) adjacent to each other in the horizontal direction. Among the two treatment vessels (37, 38), the left one is a first treatment vessel (37), and the right one is a second treatment vessel (38). The treatment vessels (37, 38) store water supplied from the water supply unit (40).

The divider (32) includes a divider body (33), and a plate insulator (34) fixed to a lower portion of the divider body (33). The divider body (33) has the shape of a vertical plate extending upward from the bottom of the water tank (31). A tapered portion (32*a*) which is tapered upward is formed at an upper end of the divider (32) (see FIGS. 2 and 3). The tapered portion thus formed may prevent water from remaining on an upper end face of the divider (32) (as will be described in detail later). The divider body (33) is made of an insulating resin material.

Figure 4:
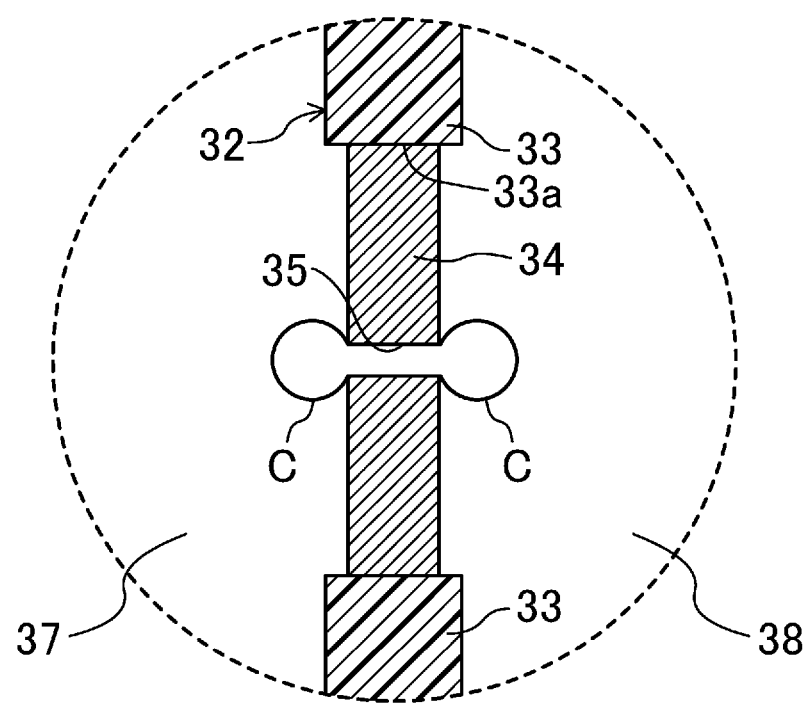
FIG. 4 is an enlarged vertical cross-sectional view illustrating the vicinity of a discharge hole of the water treatment device.

As also shown in FIG. 4, the plate insulator (34) is fitted in a mounting opening (33*a*) formed through a lower center portion of the divider body (33), and is fixed tightly to the divider body (33). The plate insulator (34) is made of an insulating material, such as ceramics or any other suitable material. A discharge hole (35), which is a fine hole, is formed through the center of the plate insulator (34). The discharge hole (35) is a cylindrical column-shaped hole extending in the thickness direction of the plate insulator (34), and allows the first and second treatment vessels (37) and (38) to communicate with each other. The discharge hole (35) constitutes a current density concentrating portion where current density between two electrodes (61, 62) increases, and a bubble generating portion which generates a bubble by Joule heat.

(Water Supply Unit)

Figure 5:
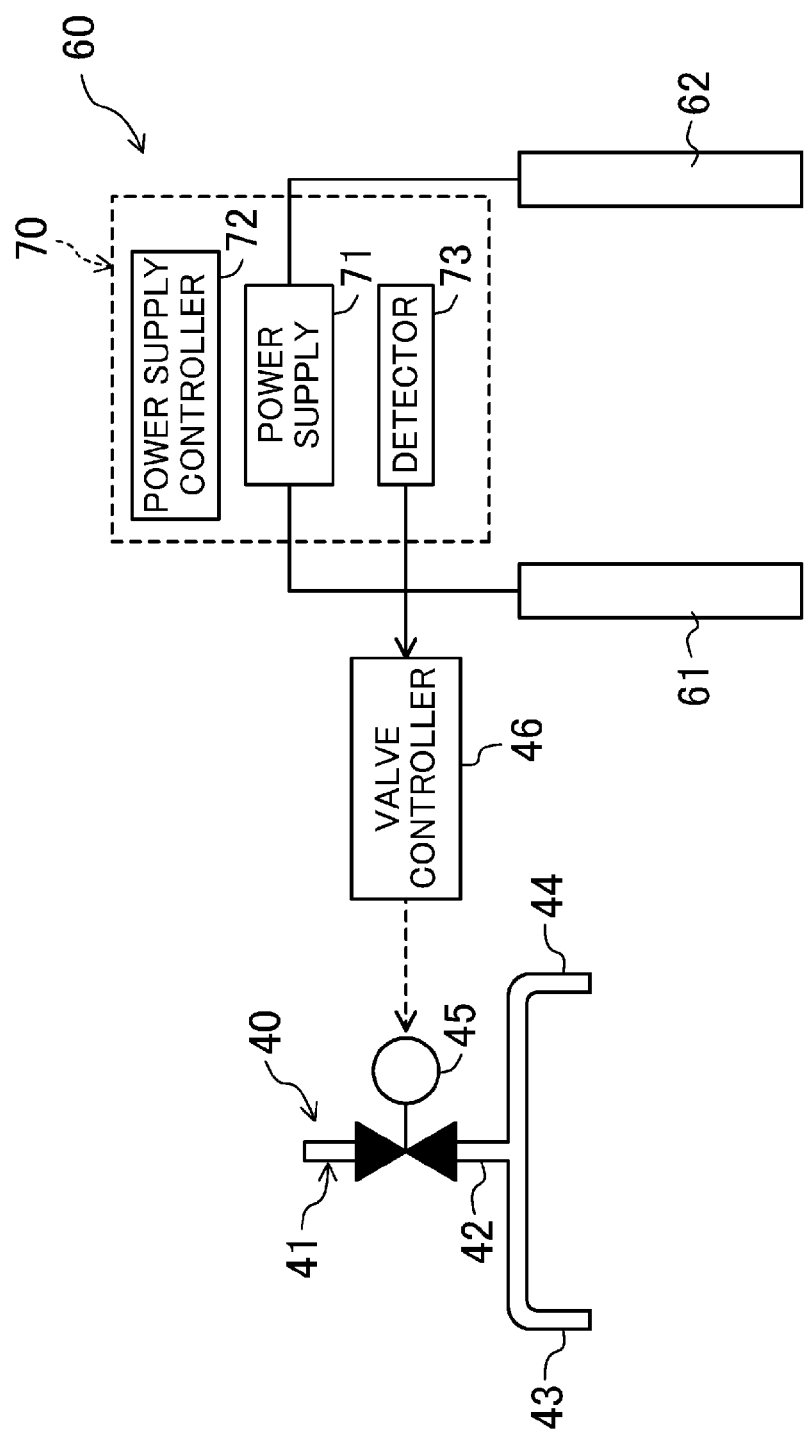
FIG. 5 is a schematic configuration diagram illustrating a discharge unit and a power supply unit.

As shown in FIGS. 2, 3, and 5, the water supply unit (40) includes a water supply pipe (41), and an electromagnetic valve (45) which switches the water supply pipe (41) between a "supply water" state and a "stop water supply" state. The water supply pipe (41) includes a main pipe (42), and first and second water supply branch pipes (43) and (44) branched from the main pipe (42) in two different directions. The first water supply branch pipe (43) is located above the first treatment vessel (37), and supplies water to the first treatment vessel (37). The second water supply branch pipe (44) is located above the second treatment vessel (38), and supplies water to the second treatment vessel (38). The electromagnetic valve (45) is provided for the main pipe (42). A valve controller (46) controls the opening/closing of the electromagnetic valve (45) as shown in FIG. 5. Note that the electromagnetic valve (45) may be replaced with a flow control valve which can control the amount of water supplied. The valve controller (46) includes a timer, and opens the electromagnetic valve (45) only for a certain period of time such that a certain amount of water is supplied from each of the water supply branch pipes (43, 44). The electromagnetic valve (45) and the valve controller (46) constitute a switch which switches between a water supply operation of supplying water through the water supply pipe (41) and a stop operation of stopping the water supply operation.

(Humidifying Element)

As shown in FIG. 2, each of the above-described humidifying elements (50) is a substantially longitudinal plate. The humidifying element (50) includes a vertical portion (51) which has the shape of a vertically oriented, rectangular parallelepiped extending in the vertical direction, and a wide portion (52) protruding from an upper portion of the vertical portion (51) in a width direction. As a whole, the humidifying element (50) has the shape of an inverted L. Between the vertical portion (51) and the wide portion (52), the humidifying element (50) is provided with a slit (53) extending upward to the middle of the wide portion (52) from its lower end. With a sidewall of the water tank (31) (e.g., a sidewall at the front in FIG. 2) inserted in the slit (53), the humidifying element (50) is secured to the water tank (31). The bottom of the vertical portion (51) of the humidifying element (50) is located above the drain pan (18).

A lower portion of the wide portion (52) of the humidifying element (50) is in the water tank (31). That is, this portion constitutes the immersed portion (54) immersed in water in the treatment vessel (37, 38). On the other hand, center and lower portions of the vertical portion (51) of the humidifying element (50) is located in the air passage (S). That is, these portions constitute the desorbing portion (55) which releases water into the air. In the humidifying element (50), the immersed portion (54) of the wide portion (52) sucks water by capillarity action, and water thus sucked gradually penetrates the desorbing portion (55).

The water treatment device (30) of this embodiment includes three humidifying elements (50) for the first treatment vessel (37), and three humidifying elements (50) for the second treatment vessel (38) (see FIGS. 2 and 3). However, the number of the humidifying elements (50) is merely an example, and two or less, or four or more humidifying elements (50) may be provided for each of the treatment vessels (37, 38). The water treatment device (30) of this embodiment has sets of humidifying elements (50) respectively on the right and left of a pair of electrodes (61, 62) which will be described in detail later (see FIGS. 2 and 3). However, the humidifying elements (50) may be arranged between the pair of electrodes (61, 62).

(Overflow Pipe)

The overflow pipe (57) constitutes a drain pipe which drains water from the first treatment vessel (37). As shown in FIGS. 2 and 3, an upper end of the overflow pipe (57) (inlet (57*a*)) opens in the first treatment vessel (37). A lower end of the overflow pipe (57) (outlet (57*b*)) opens above the drain pan (18). That is, water that flowed into the overflow pipe (57) is collected in the drain pan (18). The overflow pipe (57) is provided for only one (the first treatment vessel (37)) of the two treatment vessels (37, 38).

(Discharge Unit)

The discharge unit (60) of this embodiment constitutes a water treatment unit which treats water. The discharge unit (60) is configured to purify or sterilize water in the water tank (31) by generating discharge in the water tank (31). The discharge unit (60) includes a pair of electrodes (61, 62), and a power supply unit (70).

(Electrodes)

As shown in FIGS. 2 and 3, the pair of electrodes (61, 62) includes a first electrode (61) and a second electrode (62). The first electrode (61) is in the first treatment vessel (37), and the second electrode (62) is in the second treatment vessel (38). The pair of electrodes (61, 62) may be flat plates having the same shape, for example. The pair of electrodes (61, 62) may be made of a metallic material having high corrosion resistance. Further, in this embodiment, the first and second electrodes (61) and (62) are at the same level in their height direction. That is, the first and second electrodes (61) and (62) face each other with the divider (32) interposed therebetween.

(Power Supply Unit)

As shown in FIG. 5, the pair of electrodes (61, 62) is connected to the power supply unit (70). More specifically, the power supply unit (70) includes a power supply (71), a power supply controller (72), and a detector (73).

The power supply (71) is configured to apply a high voltage to the pair of electrodes (61, 62). More specifically, the power supply (71) applies an alternating voltage to the pair of electrodes (61, 62) such that the polarity of the pair of electrodes (61, 62) switches between positive and negative (see FIG. 8). Further, the power supply (71) of this embodiment applies a square wave, which switches between positive and negative, to the pair of electrodes (61, 62). A positive/negative alternating waveform has a duty cycle adjusted such that positive and negative times are equal to each other (50% positive and 50% negative per cycle, for example). Note that the power supply (71) may apply a positive and negative sine wave to the pair of electrodes (61, 62). The positive/negative alternating waveform does not always have the duty ratio of 50% per cycle, and a period during which no voltage is applied may be interposed between the positive and negative waveforms.

The power supply controller (72) is configured to switch between an OFF operation of turning the power supply (71) OFF, an ON operation of keeping the power supply (71) ON, and a short-term ON operation of keeping the power supply (71) ON only for a short time (shorter than the ON operation).

Figure 7:
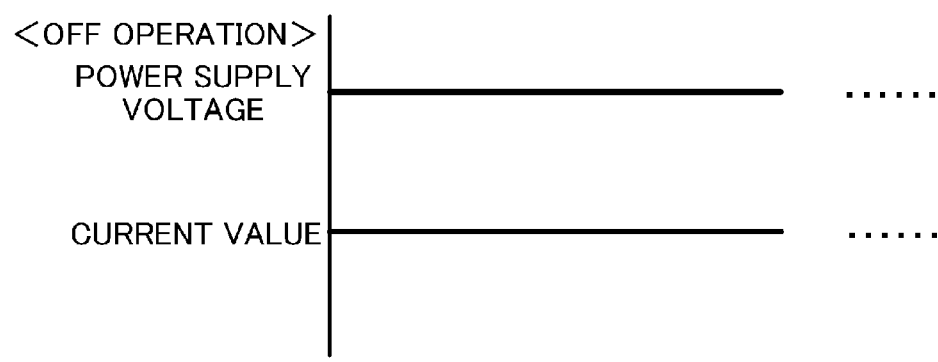
FIG. 7 is a time chart illustrating a power supply voltage and a current value during an OFF operation.

During the OFF operation, as shown in FIG. 7, the power supply (71) is turned OFF, and no voltage is applied from the power supply (71) to the pair of electrodes (61, 62). Consequently, no current flows between the pair of electrodes (61, 62).

Figure 8:
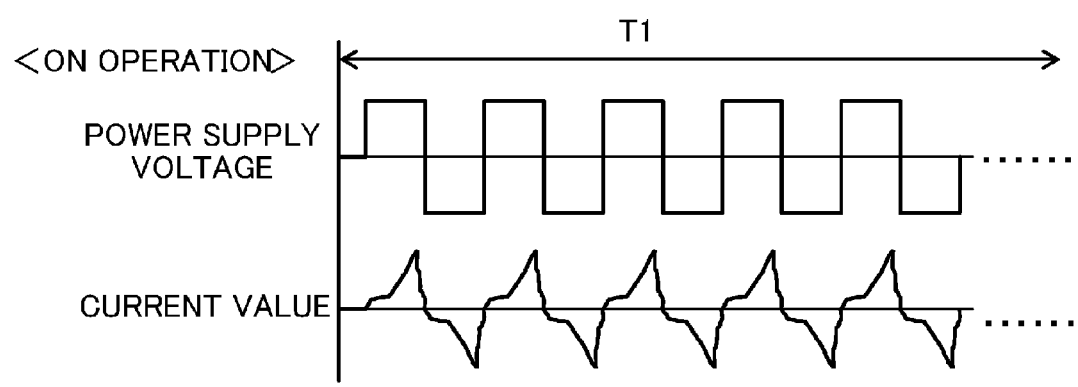
FIG. 8 is a time chart illustrating a power supply voltage and a current value during an ON operation.

During the ON operation, as shown in FIG. 8, the power supply (71) is turned ON, and a high positive voltage with a rectangular waveform and a high negative voltage with a rectangular waveform are alternately applied repeatedly from the power supply (71) to the pair of electrodes (61, 62). The ON operation is a normal discharge operation for purifying water in the water tank (31), and continues until any abnormality is found. Corresponding to the high positive and negative voltages having the rectangular waveforms, a current from the first electrode (61) to the second electrode (62), and a current from the second electrode (62) to the first electrode (61) alternately increase repeatedly.

Figure 9:
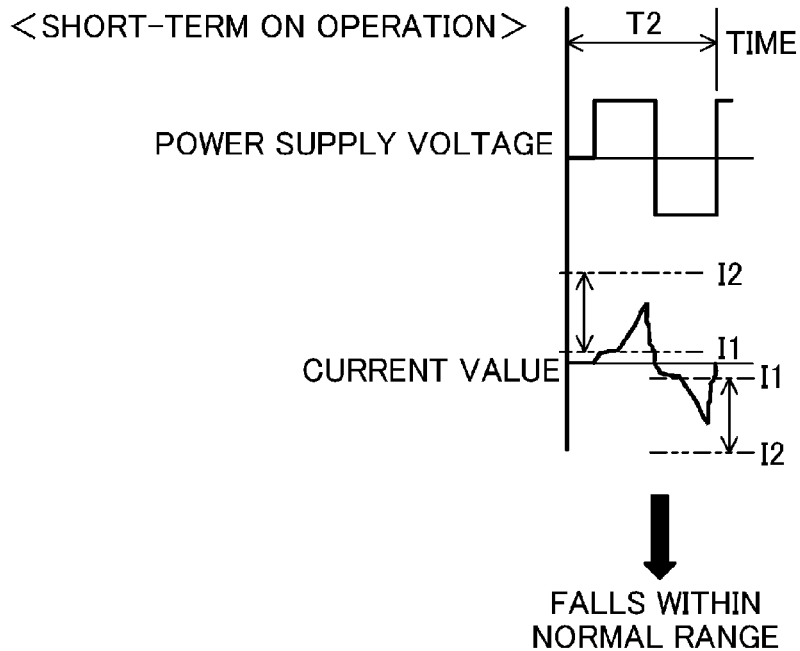
FIG. 9 is a time chart illustrating a power supply voltage and a current value when a water level is in a normal range during a short-term ON operation.
Figure 10:
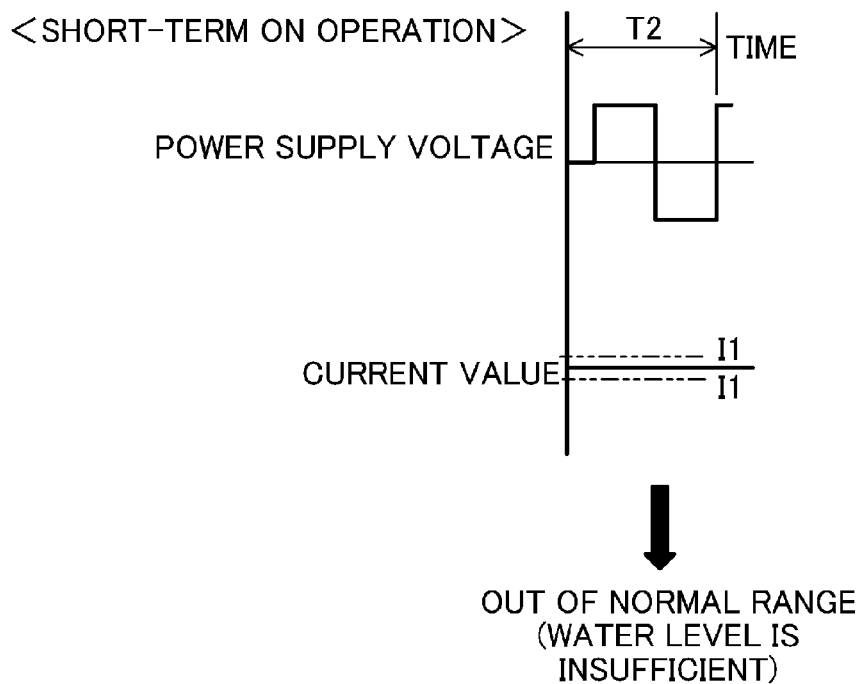
FIG. 10 is a time chart illustrating a power supply voltage and a current value when a water level is insufficient during a short-term ON operation.
Figure 11:
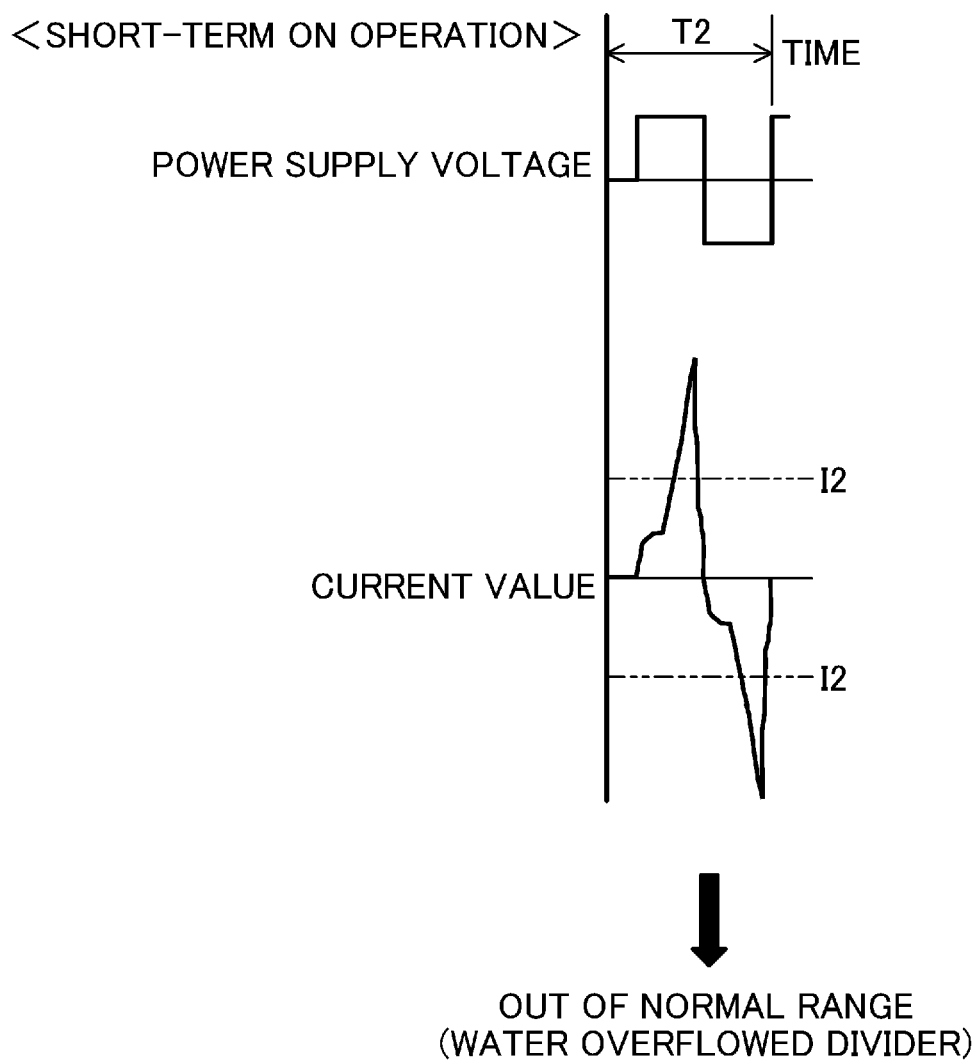
FIG. 11 is a time chart illustrating a power supply voltage and a current value when water is overflowing a divider during a short-term ON operation.

The short-term ON operation, as shown in FIGS. 9-11, is an operation of turning the power supply (71) ON for a short time (momentarily), and is performed immediately after the OFF operation. Execution time T2 of the short-term ON operation is significantly shorter than the execution time of a normal ON operation (e.g., T1). For example, the short-term ON operation according to this embodiment is performed only for a period of a single cycle during which a positive voltage is applied once and a negative voltage is applied once to the pair of electrodes (61, 62) (e.g., about one msec) as shown in FIGS. 9-11. However, the short-term ON operation is suitably performed for a minimum period required to improve the precision of water level detection to be described later, and may be performed for a period of several cycles.

The detector (73) is configured to detect the level of water in the respective treatment vessels (37, 38) based on an index corresponding to a current value between the pair of electrodes (61, 62). More specifically, the detector (73) detects whether the level of water in the respective treatment vessels (37, 38) is within, or out of, a normal range. Further, the detector (73) is configured to be able to determine whether the level of water in the respective treatment vessels (37, 38) is equal to or lower than a lower limit value out of the normal range (i.e., whether the water level is lower than the level of the electrodes (61, 62)), or the level of water in the respective treatment vessels (37, 38) is equal to or higher than an upper limit value out of the normal range (i.e., whether the water level is higher than the level of the divider (32)). Details will be described later.

<Positional Relationship between Components of Water Treatment Device and Water Level>

A positional relationship between the components of the water treatment device (30) and the water level will be described with reference to FIG. 3. Provided that an upper end of the sidewall (31a) of the water tank (31) is at a level h1, the upper ends of the humidifying elements (50) are at a higher level than h1. The upper end of the divider (32) (the tip of the tapered portion (32a)) is at a level h2 which is lower than the level h1 of the upper end of the sidewall (31a) of the water tank (31), and higher than a level h3 of the outlet (57a) of the overflow pipe (57). The level h3 of the outlet (57a) of the overflow pipe (57) is lower than the level h2 of the upper end of the divider (32), and is higher than a level h4 of the lower ends of the electrodes (61, 62). The level h4 of the lower ends of the electrodes (61, 62) is higher than a level h5 of the upper end of the discharge hole (35).

—Operation of Air Conditioner—

A basic operation of the air conditioner (10) will be described below. During the operation of the air conditioner (10), the exhaust fan (24) is operating. In addition, cold or hot water is supplied to the heat exchanger (25). In the humidifying element (50), water in the water tank (31) penetrates the desorbing portion (55).

As shown in FIG. 1, when the exhaust fan (24) operates, air to be treated flows from the air inlet (16) via a duct into the air supply chamber (S1). In the air supply chamber (S1), the filter (23) traps dust and other particles in the air. The air that has passed through the filter (23) flows into the air conditioning chamber (S2).

The air that has flowed into the air conditioning chamber (S2) passes through the heat exchanger (25). The air is cooled or heated in the heat exchanger (25). The air that has passed through the heat exchanger (25) passes around the humidifying elements (50).

If the water treatment device (30) performs a normal operation (ON operation), current density of a current path increases in the discharge hole (35) shown in FIG. 4, and water in the discharge hole (35) evaporates by Joule heat to generate a bubble (C). The bubble (C) entirely fills the discharge hole (35). In this state, the bubble (C) functions as a resistor which prevents water in the two treatment vessels (37, 38) from becoming conductive. Thus, the electrode (61) and an interface between water surrounding the electrode (61) and the bubble (C) have the same potential, and so do the electrode (62) and an interface between water surrounding the electrode (62) and the bubble (C). These interfaces constitute electrodes. As a result, breakdown occurs in the bubble (C), thereby causing discharge.

As described above, if discharge occurs in the bubble (C), highly oxidizing materials (active species), such as hydrogen peroxide and hydroxyl radicals, are produced in the water in the treatment vessels (37, 38). These materials purify or sterilize the water in the treatment vessels (37, 38).

The water thus cleaned is gradually absorbed into the immersed portion (54) of the humidifying element (50) shown in FIG. 2, and penetrates the desorbing portion (55) of the vertical portion (51) of the humidifying element (50). Then, the water in the desorbing portion (55) is released into the air to humidify it. The water that has penetrated the humidifying elements (50) is sterilized and purified by hydroxyl radicals and hydrogen peroxide. This may prevent the growth of mold and unwanted bacteria on the humidifying elements (50), and prevent buildup of odor. Further, in the air conditioning chamber (S2), the air humidified by the released water is also purified.

The air thus humidified and cleaned by the humidifying elements (50) is sucked into the exhaust fan (24), sent via the blow-off nozzle (24a) and the air outlet (17) to the duct, and supplied to a predetermined space.

—Operation of Water Treatment Device—

It will now be described with reference to FIGS. 6-20 how the water treatment device (30) works while the air conditioner (10) operates.

If the air conditioner (10) operates, the water treatment device (30) starts to operate. Immediately after the treatment device (30) has started to operate, a power-OFF operation is performed (step ST1), during which no voltage is applied from the power supply (71) to the electrodes (61, 62). After the power-OFF operation, a short-term power-ON operation is performed in step ST2. During the short-term ON operation, an alternating voltage is momentarily applied from the power supply (71) to each of the electrodes (61, 62) as shown in FIGS. 9-11.

(Control at Insufficient Water Level)

Figure 12:
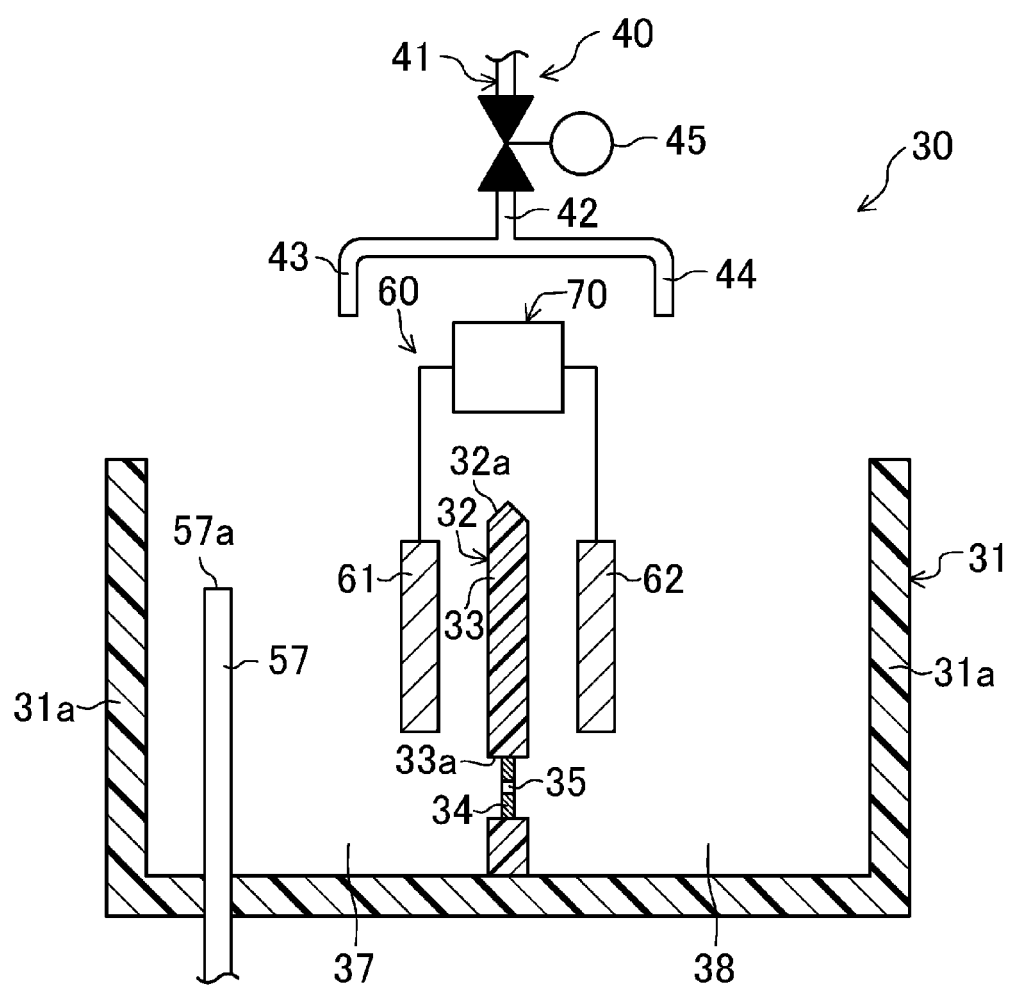
FIG. 12 is a schematic configuration diagram illustrating a water treatment device in which no humidifying element is shown, and a water tank is empty.

For example, suppose that the water tank (31) is completely empty as shown in FIG. 12 at the beginning of the operation of the water treatment device (30). Even if the short-term power-ON operation is performed in this state, the pair of electrodes (61, 62) is exposed in the air. Thus, in this state, the above-described bubble (C) is not generated in the discharge hole (35), and the discharge in the bubble (C) does not occur. Consequently, humidified, purified, or sterilized water is neither produced nor supplied to the humidifying elements (50).

If the flow proceeds to step ST3 from this state, the detector (73) detects whether the current value between the pair of electrodes (61, 62) lies within a normal range. Since the level of water in the water tank (31) is lower than the pair of electrodes (61, 62), no current flows between the pair of electrodes (61, 62) (i.e., current value ≈0 mA)). Note that the detector (73) detects the current value between the pair of electrodes (61, 62) using, for example, a current value of a current path between the power supply (71) and the electrodes (61, 62) as an index.

As shown in FIG. 9, the power supply unit (70) has a lower limit value I1 and an upper limit value I2, between which the current value between the pair of electrodes (61, 62) falls within the normal range. In this example, since the current value is below the lower limit value I1 as shown in FIG. 10, it is determined in step ST3 that the current value is out of the normal range, and eventually, it is determined that the water level is out of the normal range (step ST4). As a result, the short-term power-ON operation is finished, and the OFF operation is performed again (step ST5). Then, the power supply (71) is turned OFF, thereby quickly preventing the power supply (71) from being kept ON improperly.

Then, it is determined in step ST6 whether the current value detected by the detector (73) in step ST3 is zero (whether the current flowed). If the current value is zero, it can be concluded that the electrodes (61, 62) are not immersed in water (step ST7). Then, the detector (73) sends a signal to the valve controller (46). Having received the signal, the valve controller (46) allows the electromagnetic valve (45) to open only for a predetermined time. Then, a predetermined amount of water is temporarily supplied from the water supply unit (40) into the water tank (31) (step ST8).

Note that the amount of water supplied into the water tank (31) in step ST8 is controlled to a certain predetermined amount. For example, this certain predetermined amount of water may be set to an amount of water which fills the empty water tank (31) (shown in FIG. 12) to a level L1 shown in FIG. 13 (i.e., to a level slightly lower than the electrodes (61, 62)).

Figure 13:
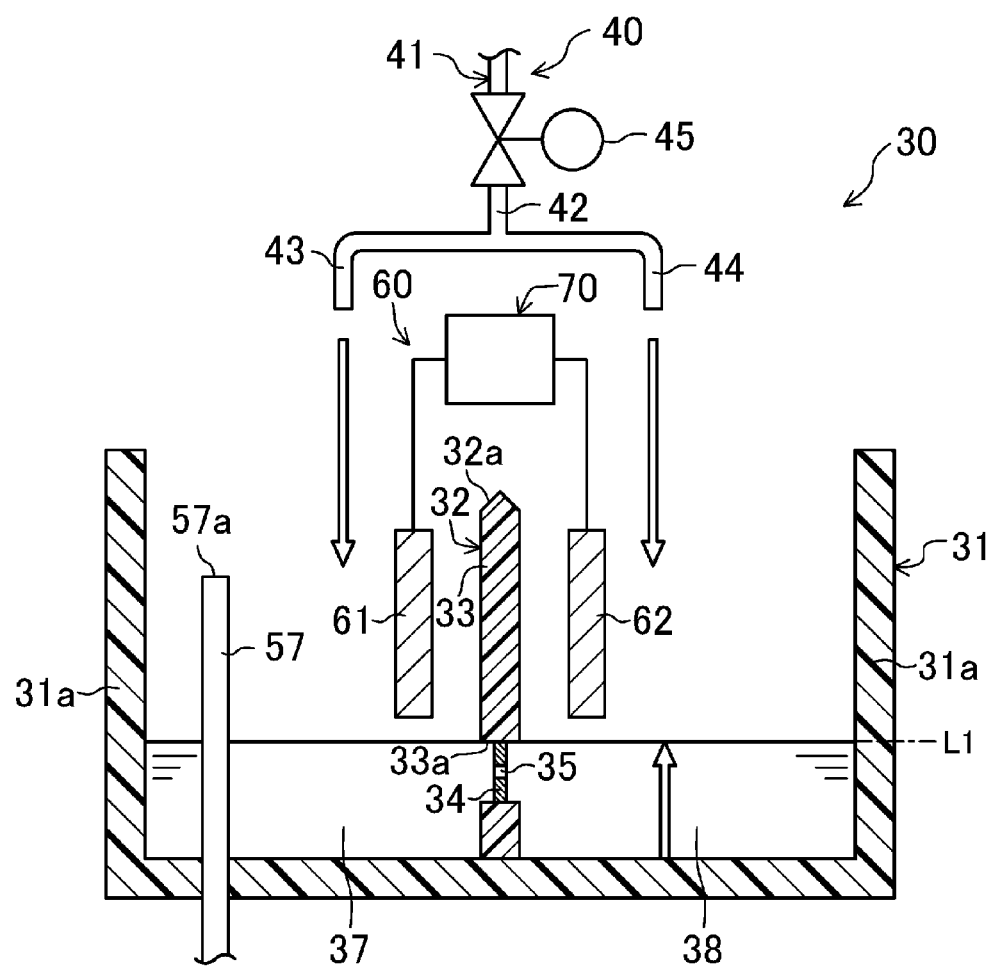
FIG. 13 is a schematic configuration diagram illustrating a water treatment device in which no humidifying element is shown, and a water supply operation has been performed once ensuing from the state shown in FIG. 12.

If the process moves on to steps ST2 and ST3 from the state shown in FIG. 13, the short-term power-ON operation is performed again, and it is determined again whether the current value lies within the normal range. In the state of FIG. 13, the electrodes (61, 62) are not yet immersed in water. Thus, in step ST3, it is determined that the current value is out of the normal range (step ST4), and the power-OFF operation is performed (step ST5) to turn the power supply (71) OFF. Then, in step ST6, it is determined again that the current value is zero. Consequently, it is determined that the electrodes (61, 62) are not immersed in water (step ST7), and the process moves on to step ST8 to supply water again. The amount of water supplied in this step is the same as that supplied in step ST8.

Figure 14:
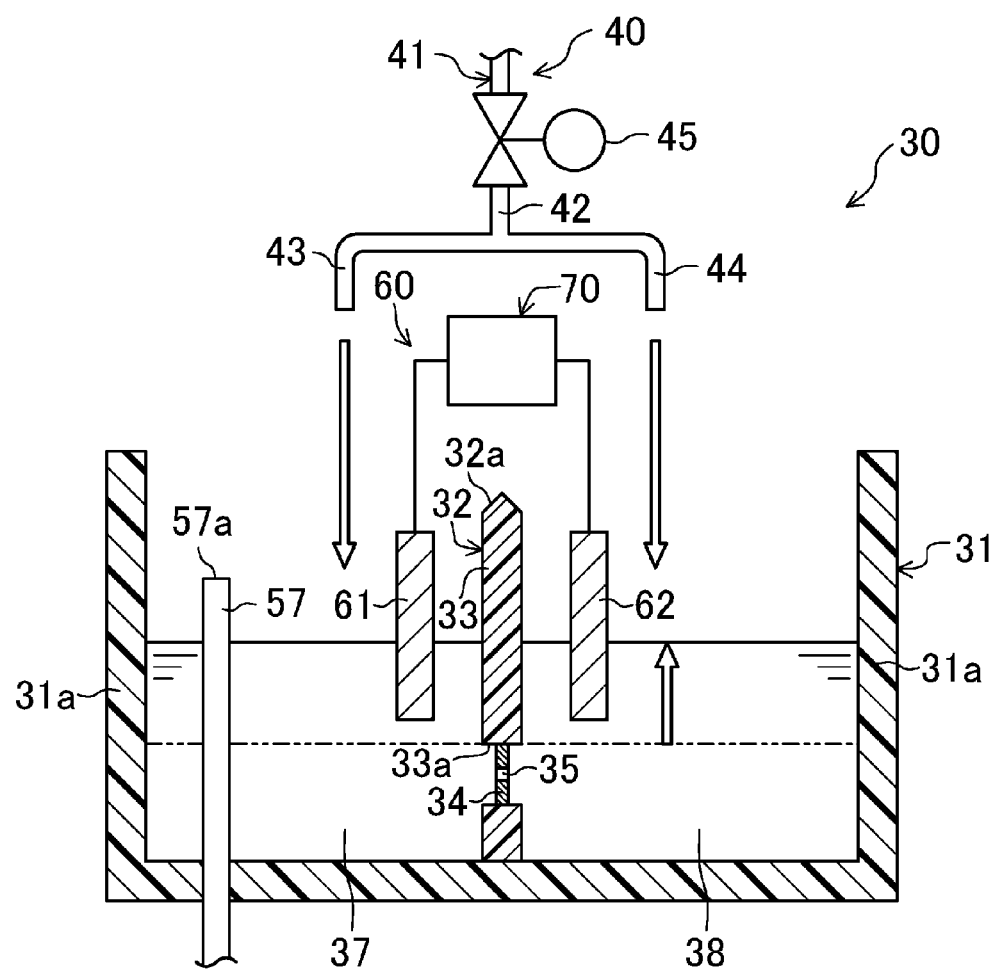
FIG. 14 is a schematic configuration diagram illustrating a water treatment device in which no humidifying element is shown, and a water supply operation has been performed twice ensuing from the state shown in FIG. 12.

Through the repetitive supply of water, the electrodes (61, 62) are immersed in water as shown in FIG. 14. In this state, if the process moves on to steps ST2 and ST3, the current value between the pair of electrodes (61, 62) (e.g., the maximum value) falls within the normal range (between the values I1 and I2) as shown in FIG. 9 during the short-term power-ON operation. This is because discharge occurs normally in the bubble (C) in the state of FIG. 14 as described above. Thus, in this case, the flow moves on from step ST3 to step ST11, and it is determined that the water level lies within the normal range. Then, the flow moves on to step ST12 to continue the power-ON operation (normal discharge operation).

(Control at Excessively Risen Water Level)

Figure 15:
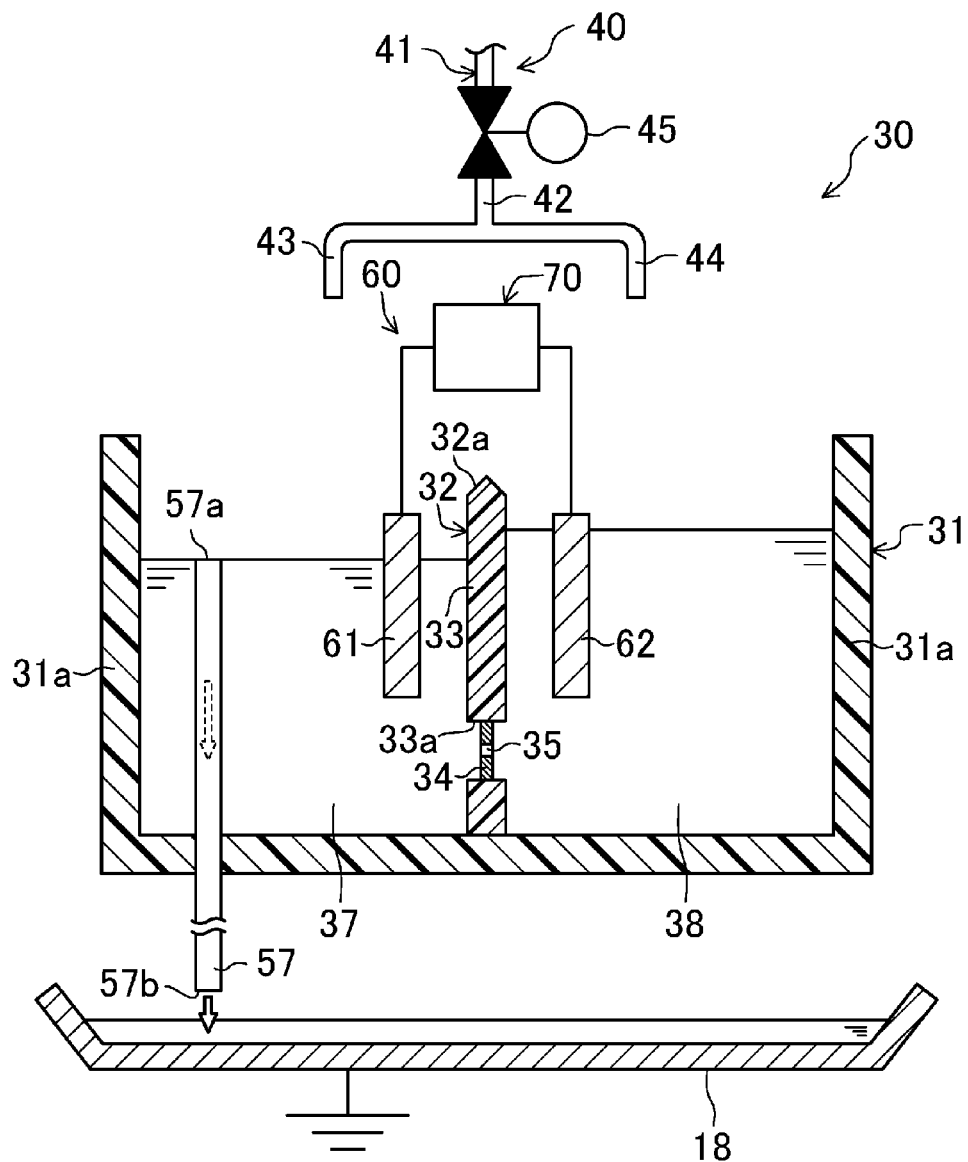
FIG. 15 is a schematic configuration diagram illustrating a water treatment device in which no humidifying element is shown, and a water level is at the level of an inlet of an overflow pipe.

If any malfunction occurs in the water treatment device (30), the level of water in the water tank (31) may conversely excessively rise. If the water level reaches the inlet (57a) of the overflow pipe (57) as shown in FIG. 15, the water in the first treatment vessel (37) flows into the overflow pipe (57) so that the water level does not rise any further. The water that has flowed into the overflow pipe (57) flows downward into the drain pan (18). Thus, the water is temporarily stored in the drain pan (18).

If, hypothetically, the overflow pipe (57) is provided for each of the two treatment vessels (37, 38), water flowing out of one of the overflow pipes (57) is electrically connected to water flowing out of the other overflow pipe (57) via water in the drain pan (18). This may cause a short circuit between the pair of electrodes (61, 62) via the two overflow pipes (57) and the water in the drain pan (18), and a desired discharge cannot occur. According to this embodiment, however, the overflow pipe (57) is provided only for one of the two treatment vessels (37, 38), i.e., the first treatment vessel (37). Therefore, such a short circuit may be effectively prevented.

If the overflow pipe (57) is provided only for one treatment vessel (37), the difference between the level of water in the first treatment vessel (37) and the level of water in the second treatment vessel (38) increases. This increases a creepage distance d between a surface of water in the first treatment vessel (37) and a surface of water in the second treatment vessel (38) measured along the surface of the divider (32) as shown for example in FIG. 17. This allows the water treatment device to return quickly to a normal discharge operation even under the condition of the level of water in the water tank (31) being relatively high.

Figure 16:
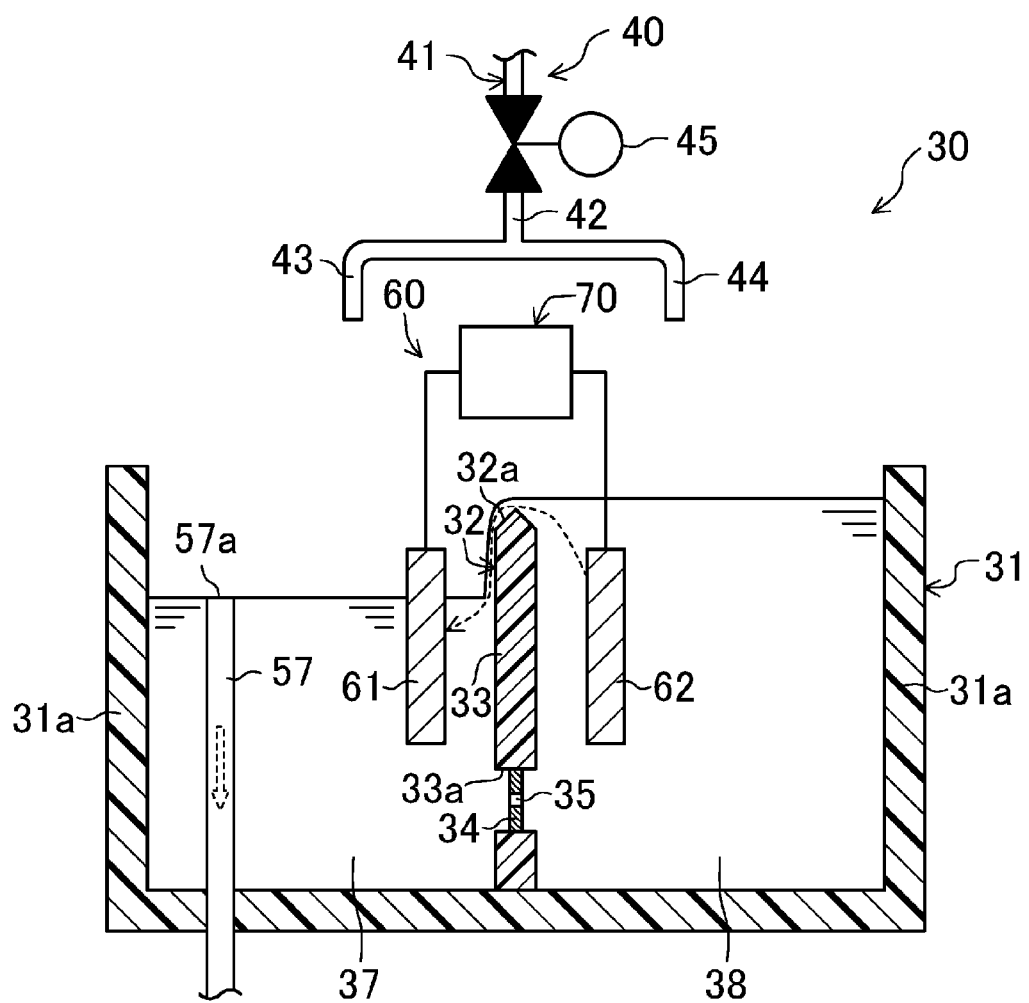
FIG. 16 is a schematic configuration diagram illustrating a water treatment device in which no humidifying element is shown, and water is overflowing a divider.

If the level of water rises further even after the water has been drained via the overflow pipe (57), the water in the second treatment vessel (38) flows over the divider (32) into the first treatment vessel (37) as shown in FIG. 16. As a result, a short circuit occurs between the first and second electrodes (61) and (62) via the water that has overflowed the upper end of the divider (32).

If the process moves on from this state to steps ST2 and ST3, the short-term power-ON operation is performed, and it is determined again whether the current value lies within the normal range. In the state shown in FIG. 16, the current value between the pair of electrodes (61, 62) momentarily increases due to the short circuit thus occurred. Then, as shown in FIG. 11, the current value (e.g., the maximum value) temporarily exceeds I2, and deviates from the normal range. Therefore, in such a case, the process moves on to step ST4, and it is determined that the water level is out of the normal range. Then, the power-OFF operation is performed (step ST5).

The power-OFF operation, if quickly performed upon a significant rise of the water level, may effectively prevent electrical leakage to peripheral devices even if water flows out of the water tank (31). This ensures the reliability of the water treatment device (30) or the air conditioner (10).

Then, in step ST6, it is determined whether the current value is zero. If a short circuit occurs due to water that has flowed from the water tank (31) over the divider (32), the current value is not zero. Thus, the flow proceeds to step ST9, and it is determined that water has flowed over the divider (32). As a result, a standby operation is performed for a predetermined time in step ST10, and a stop operation to stop the water supply continues. In this way, the stop operation continues in step ST10, which may substantially prevent improper voltage application. During the stop operation, water in the water tank (31) is gradually absorbed into the humidifying elements (50), which lowers the level of water in the water tank (31).

(Advantages of Tapered Portion)

Figure 17:
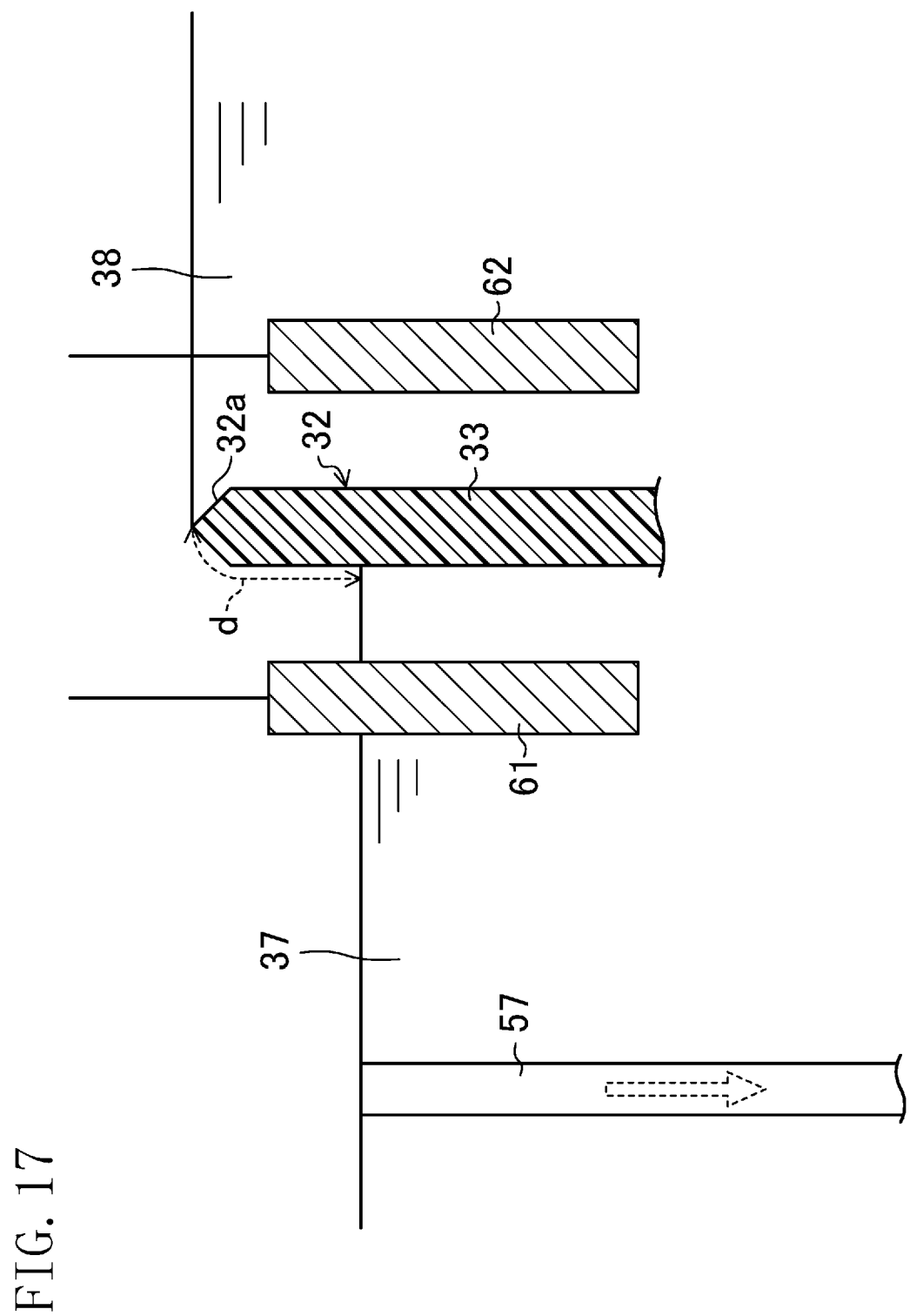
FIG. 17 is an enlarged schematic configuration diagram illustrating an upper end of a divider, up to which a level of water in a second treatment vessel has come.

As shown in FIG. 17, suppose that the level of water in the second treatment vessel (38) is near the upper end of the divider (32). In this embodiment, the tapered portion (32a) is formed at the upper end of the divider (32), which reduces surface tension at the upper end of the divider (32). In addition, the tapered portion (32a) allows water adhered to the upper end of the divider (32) to flow downward by its own weight. That is, the tapered portion (32a) formed at the upper end of the divider (32) provides good drainage from the upper end of the divider (32). This may avoid leakage of current and abnormal discharge between the pair of electrodes (61, 62) via water remained at the upper end of the divider (32).

(Control at Water Level within Normal Range)

Figure 18:
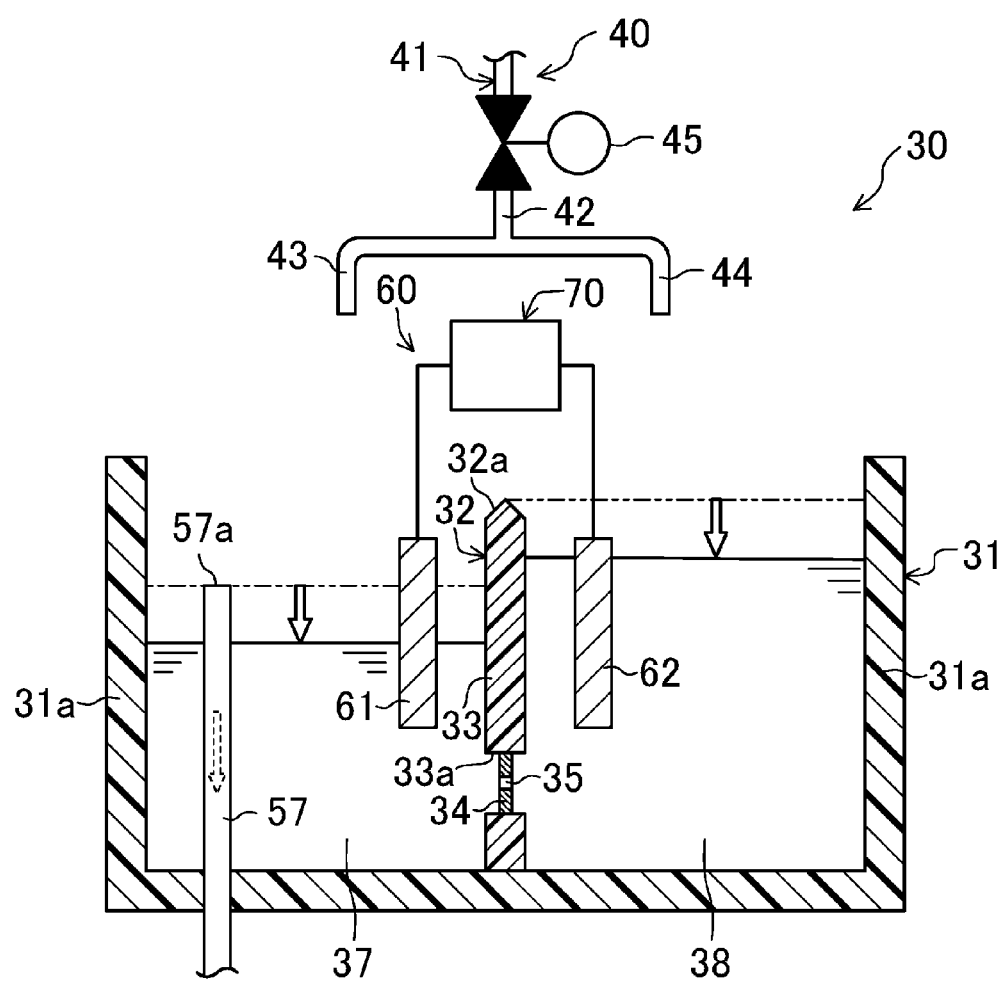
FIG. 18 is a schematic configuration diagram illustrating a water treatment device in which no humidifying element is shown, and the level of water has become lower than that shown in FIG. 16.
Figure 19:
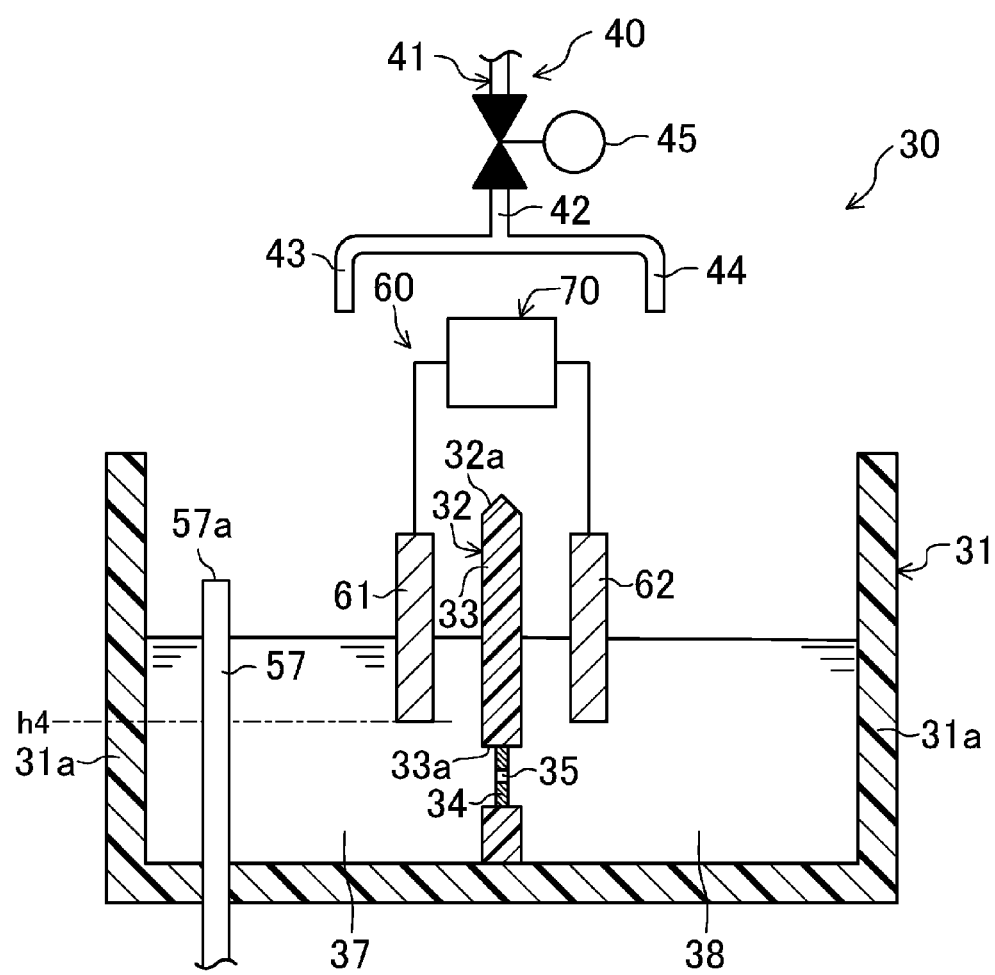
FIG. 19 is a schematic configuration diagram illustrating a water treatment device in which no humidifying element is shown, and the level of water lies within a normal range.

When the level of water in the water tank (31) is lowered as shown in FIG. 18, and the water level falls within the normal range as shown in FIG. 19, the process moves on to steps ST2, ST3, and ST11, and it is determined that the water level lies within the normal range. Consequently, the power-ON operation starts (step ST12), and normal discharge is generated.

If the normal power-ON operation is performed in step ST12, it is determined again in step ST13 whether the current value lies within the normal range. If it is determined in step ST13 that the water level is in the normal range, the current value falls within the normal range between the values I1 and I2 as shown in FIG. 9, and the power-ON operation continues (steps ST14 and ST12).

On the other hand, in step ST13, if, for example, the water level becomes lower than h4 shown in FIG. 19 and the electrodes (61, 62) are exposed in the air, the current value between the pair of electrodes (61, 62) becomes zero. Then, as described above, the process proceeds in the following order: ST1→ST2→ST3→ST4→ST5→ST6→ST7→ST8→ST2→ . . . .

On the other hand, if, in step ST13, the water level exceeds the level of the divider (32), for example, and it is determined that the current value is out of the normal range and is not zero, the process proceeds in the following order: ST15→ST2→ST3→ST4→ST5→ST6→ST9→ST10→ST2 . . . .

(Case of Water Level at Lower End of Discharge Hole)

Figure 20:
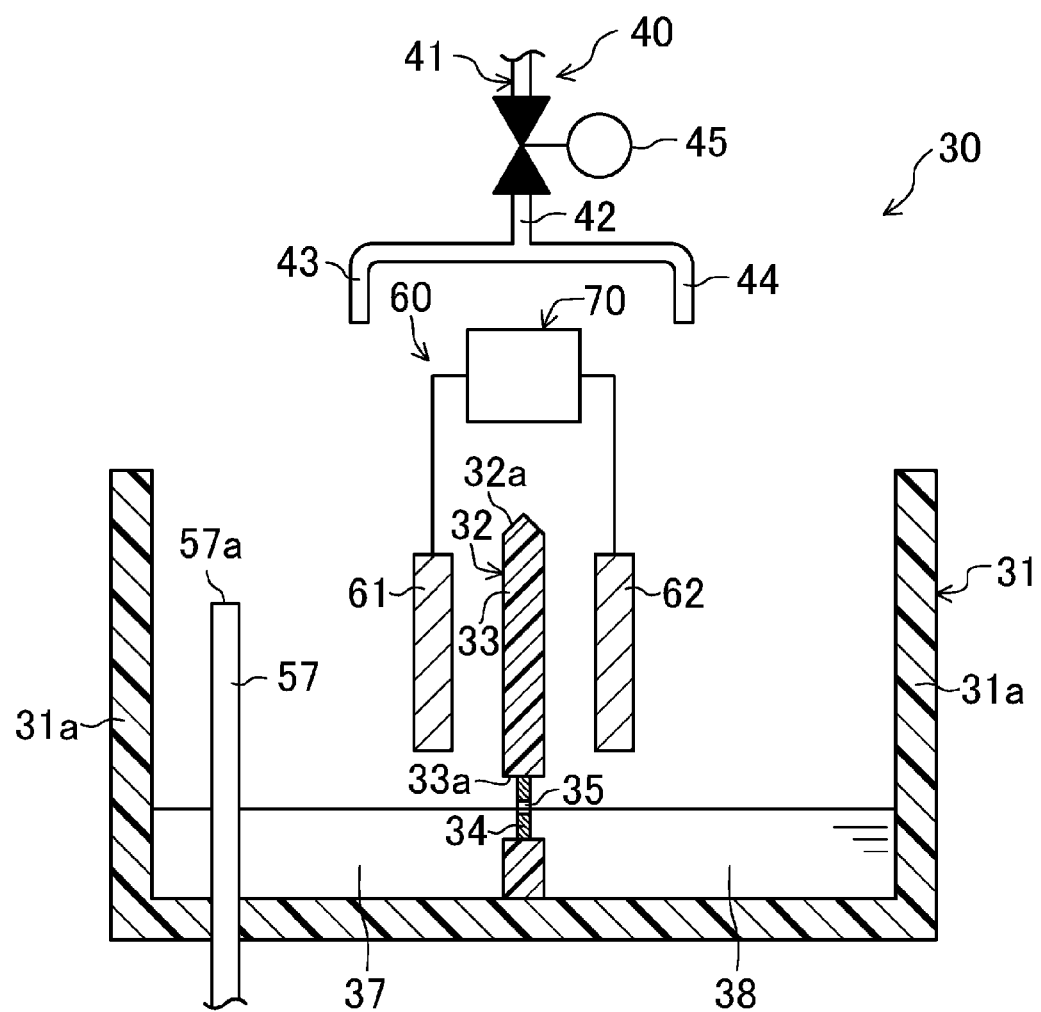
FIG. 20 is a schematic configuration diagram illustrating a water treatment device in which no humidifying element is shown, and the level of water is almost at the same level as a lower end of a discharge hole.

Suppose that the level of water in the water tank (31) is near the lower end of the discharge hole (35) as shown in FIG. 20. Since the lower ends of the electrodes (61, 62) are at a level higher than the upper end of the discharge hole (35), the electrodes (61, 62) are not immersed in water at that level.

If, hypothetically, the electrodes (61, 62) are immersed in water at that level, the temperature of a surface of the lower end of the discharge hole (35) may suddenly increase or abnormal discharge may occur, which is disadvantageous. In contrast, according to this embodiment, the lower ends of the electrodes (61, 62) are located above the upper end of the discharge hole (35). Thus, the pair of electrodes (61, 62) is not in conduction with each other when water in the water tank is at that level, which effectively prevents the occurrence of such disadvantageous events.

—Advantages of Embodiment—

According to this embodiment, the pair of electrodes (61, 62) of the discharge unit (60) is used to detect the level of water in the water tank (31). This may reduce the number of other water level detectors such as a float switch or any other suitable components, and contribute to reduction of parts count, and to cutting down costs. Further, unlike the float switch or any other suitable component, a water level detector, which is comprised of the pair of electrodes (61, 62), does not break down even if a high voltage is applied thereto. Thus, a highly reliably water level detector may be provided.

In steps ST3 and ST13, detecting whether the current value between the electrodes (61, 62) falls within a normal range makes it possible to quickly determine whether the water level is lower than the level of the electrodes (61, 62), or whether water in the treatment vessel (37, 38) is overflowing the divider (32). Thus, in the case of abnormality, the power supply (71) can be immediately turned OFF. This may prevent the power supply (71) from being kept ON improperly under the condition where a normal operation cannot be performed.

Further, the power supply (71) is turned OFF also in the case where water overflows the water tank (31). This may prevent leakage of current to peripheral devices, and ensure the reliability of the water treatment device.

The power-ON operation is inhibited during the water supply operation performed in step ST8 by the water supply unit (40). This may effectively prevent a short circuit from occurring between the pair of electrodes (61, 62) via water supplied into the respective treatment vessels (37, 38) through the water supply pipe (41).

As done in steps ST2 and ST3, since it is determined during the short-term ON operation—which is performed for a shorter time than the normal ON operation—whether the current value lies within the normal range, it may be quickly determined whether the water level is abnormal without keeping the power supply (71) ON for an excessively long time. Thus, if the water level is abnormal, the device may quickly be shifted to the OFF operation.

If the current value between the pair of electrodes (61, 62) is out of the normal range and no current flows between the electrodes (61, 62) during the short-term ON operation, the water supplier temporarily supplies water (step ST7). This may bring the water level, which is lower than the level of the electrodes (61, 62), closer to the normal range.

If the current value between the pair of electrodes (61, 62) is out of the normal range and a current is flowing between the electrodes (61, 62) during the short-term ON operation, a stop operation is performed, and then the humidifying elements (50) gradually drain water (step ST9). This may bring the water level, which is excessively high, closer to the normal range.

Figure 6:
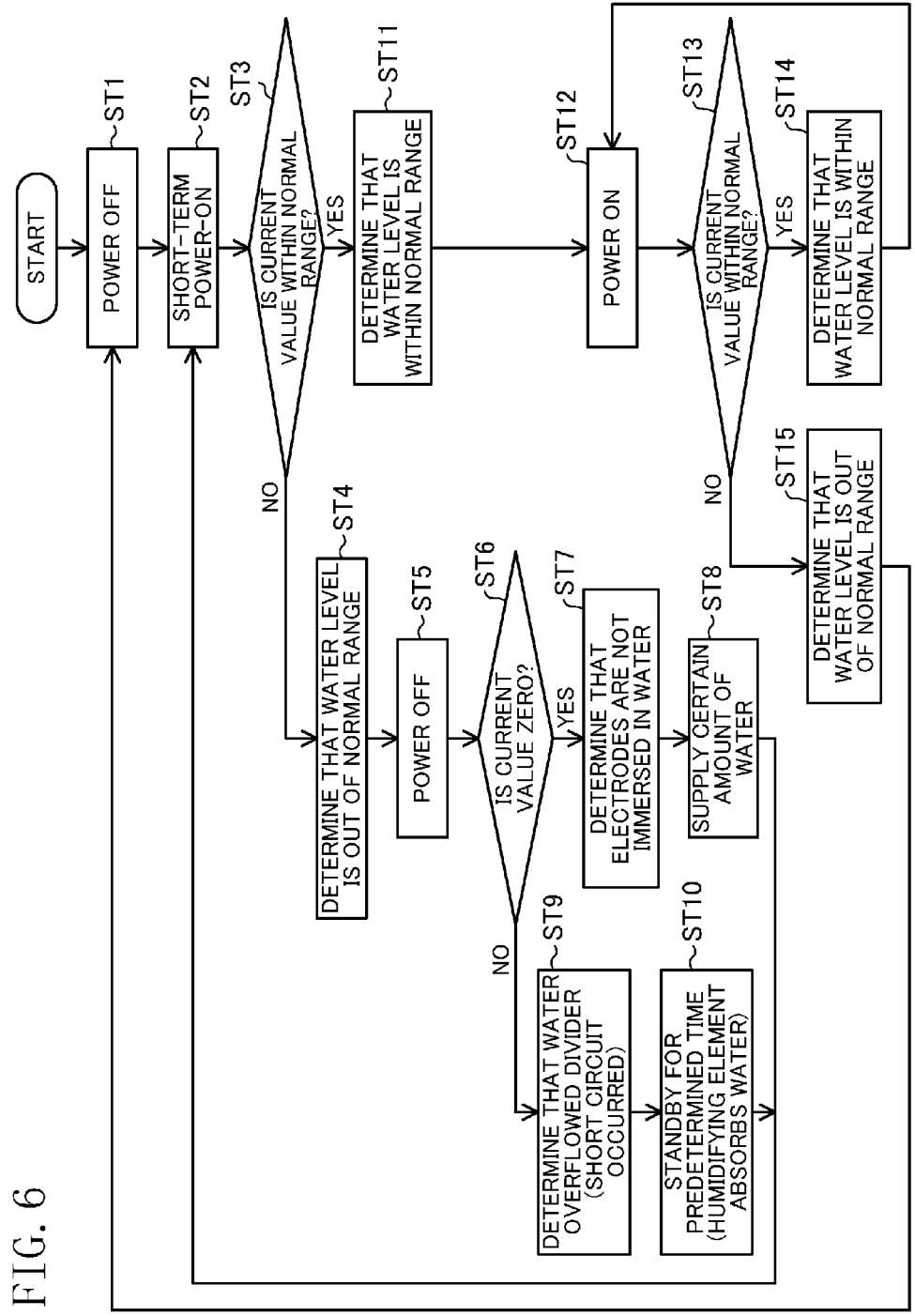
FIG. 6 is a flowchart illustrating how the water treatment device is controlled.

In the control flow chart shown in FIG. 6, the short-term ON operation and the detection of the water level by the detector (73) are repeated until the current value between the pair of electrodes (61, 62) falls within the normal range. Therefore, the level of water in the water tank (31) may reliably converge to the normal range.

As shown in FIG. 17, the tapered portion (32a) is formed at the upper end of the divider (32). This improves drainage from the upper end of the divider (32), thereby reducing leak current, and preventing abnormal discharge.

Further, since the overflow pipe (57) is not provided one each for each of the treatment vessels (37, 38), a short circuit does not occur between the pair of electrodes (61, 62) via the overflow pipe (57) and water in the drain pan (18).

Moreover, as shown in FIG. 15, the overflow pipe (57) is provided only for one treatment vessel (37). Thus, the level of water in the first treatment vessel (37) tends to be lower than the level of water in the second treatment vessel (38). That is, the two treatment vessels (37, 38) of the water tank (31) show a difference in water level. This increases a creepage distance d between surfaces of water in the two treatment vessels (37, 38) measured along the surface of the divider (32) (see FIG. 17). As a result, a sufficient creepage distance d between the surfaces of water in the two treatment vessels (37, 38) is ensured even under the condition of a relatively high level of water in the water tank (31). Thus, even under such a condition, the device may quickly return to the normal discharge operation.

The current carrier of the divider (32) is comprised of the discharge hole (35). Thus, a bubble is generated to fill the discharge hole (35), and discharge may be generated within the bubble. As a result, materials produced by the discharge, i.e., active species, purify and sterilize water.

If the level of water is near the lower end of the discharge hole (35), the pair of electrodes (61, 62) may be effectively prevented from being energized, which may effectively prevent abnormal discharge.

Thus, the present invention provides an air conditioner (humidifier (10)) including a water treatment device (30) which does not require a water level detector.

—Alternative Examples Of Embodiment—

The above-described embodiment may be modified in the following manner.

<First Alternative Example>

A first alternative example is different from the above-described embodiment in the configuration of the water treatment device (30). Specifically, the water treatment device (30) of the first alternative example is configured to perform an electrolysis process of producing acid water and alkali water by electrolysis. That is, a treatment unit of the water treatment device (30) is comprised of an electrolysis unit (80).

Figure 21:
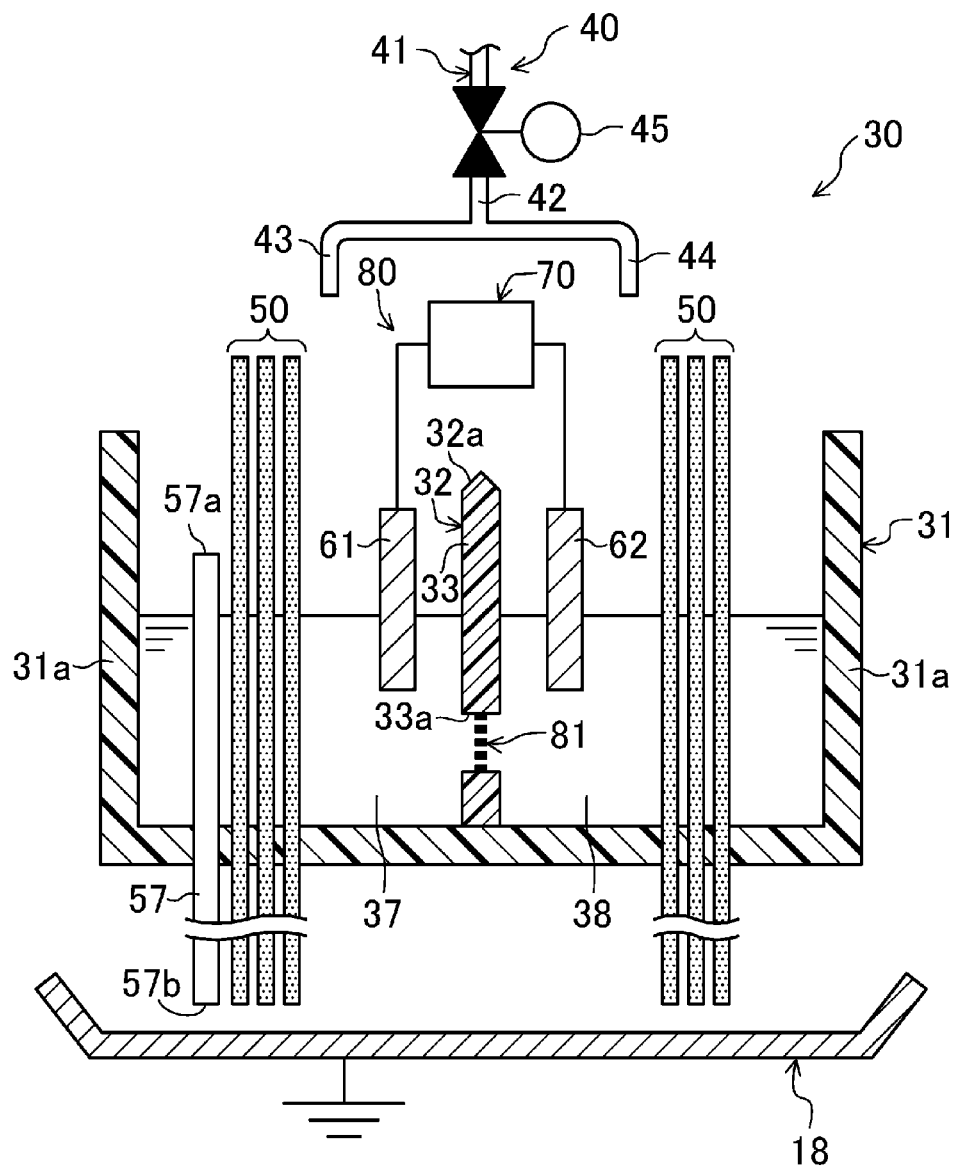
FIG. 21 is a view corresponding to FIG. 3, illustrating a water treatment device according to an alternative example.

As shown in FIG. 21, the electrolysis unit (80) includes, just like the discharge unit of the above-described embodiment, a first electrode (61), a second electrode (62), and a power supply unit (70). The first electrode (61) is immersed in water in a first treatment vessel (37), and the second electrode (62) is immersed in water in a second treatment vessel (38). The first electrode (61) is connected to a positive electrode of the power supply unit (70), and the second electrode (62) is connected to a negative electrode of the power supply unit (70). That is, the power supply unit (70) applies a positive voltage to the first electrode (61), and a negative voltage to the second electrode (62). A divider (32) of the electrolysis unit (80) is provided with an ion-exchange membrane (81) as a current carrier.

According to the first alternative example, if the ON operation is performed, hydrogen ions are generated in the first treatment vessel (37), and hydroxide ions are generated in the second treatment vessel (38). As a result, acid water is produced in the first treatment vessel (37), and alkali water is produced in the second treatment vessel (38). The acid water and alkali water thus produced are sent via humidifying elements (50) to a desorbing portion (55). Consequently, air passing through the desorbing portion (55) may be deodorized and purified by weak acid and weak alkali.

Also in the first alternative example, the levels of water in the treatment vessels (37, 38) may be detected and controlled in the same manner as in the above-described embodiment (see FIG. 6). Other advantages of the first alternative example are the same as those of the above-described embodiment.

<<Other Embodiments>>

The above-described embodiment may be modified in the following manner.

For the determination of the water level by the detector (73) according to the above-described embodiment, the current value between the pair of electrodes (61, 62) is measured based on, for example, the current value of the current path between the power supply (71) and the electrodes (61, 62). However, the current value between the pair of electrodes (61, 62) may be obtained using other indices, such as a voltage value (potential difference) between the pair of electrodes (61, 62), and a value of resistance between the pair of electrodes (61, 62).

More specifically, if, for example, the potential difference between the pair of electrodes (61, 62) is lower than the lower limit value (approximately 0) in step ST6 shown in FIG. 6, it is determined that a short circuit has occurred, and the process moves on to step ST9. If the potential difference is not lower than the lower limit value, it is determined that the electrodes are not immersed in water, and the process moves on to step ST7.

Further, according to the above-described embodiment, it is determined in step ST13 whether the current value lies within the normal range, and the process moves on to ST14 if the current value lies within the normal range, or to ST15 if that is not the case. However, it may be for example determined in step ST13 whether the current value is out of the normal range (in an abnormal range), and the process may move on to ST15 if the current value is out of the normal range, or to ST14 if that is not the case.

The water treatment device (30) according to this embodiment is installed in the air conditioner (10) implemented as an air handing unit. However, this water treatment device (30) may be applied to an apparatus for simply purifying and sterilizing water (water purification apparatus), or to a simple humidifier which does not heat or cool the air.

The water treatment device (30) according to the present embodiment does not include any other detector than the pair of electrodes (61, 62). However, another detector may be provided in addition to the pair of electrodes (61, 62). Also in this case, the number of water level detectors may be reduced as compared to a water treatment device of a general configuration, which contributes to cost reduction.

INDUSTRIAL APPLICABILITY

As can be seen from the foregoing, the present invention is useful for a water treatment device and a humidifier.

DESCRIPTION OF REFERENCE CHARACTERS

10 Air Conditioner (Humidifier)
11 Casing (Passage Forming Member)
18 Drain Pan (Sump)
30 Water Treatment Device
31 Water Tank
32 Divider
32*a* Tapered Portion
35 Discharge Hole (Small Hole, Current Carrier)
37 First Treatment Vessel (Treatment Vessel)
38 Second Treatment Vessel (Treatment Vessel)
40 Water Supplier
41 Water Supply Pipe
45 Electromagnetic Valve (Switch)
46 Valve Controller (Switch)
50 Humidifying Element (Water Absorbing Member, Draining Member)
54 Immersed Portion
55 Desorbing Portion
57 Overflow Pipe (Drain Pipe)
57*a* Inlet
57*b* Outlet
60 Discharge Unit (Treatment Unit)
61 First Electrode (Electrode)
62 Second Electrode (Electrode)
70 Power Supply Unit
71 Power Supply
72 Power Supply Controller
73 Detector
80 Electrolysis Unit (Treatment Unit)
81 Ion-Exchange Membrane (Current Carrier)

The invention claimed is:

1. A water treatment device, comprising:
a water tank which stores water;
an insulating divider which divides a space inside the water tank into two treatment vessels adjacent to each other in a horizontal direction, and includes a current carrier which is able to energize water in the two treatment vessels;
a treatment unit including a pair of electrodes arranged one each in each of the treatment vessels, a power supply which applies a voltage to the pair of electrodes, and a power supply controller which switches between an ON operation of keeping the power supply ON and an OFF operation of turning the power supply OFF;
a water supplier which supplies water to each of the treatment vessels; and
a draining member which drains water from each of the treatment vessels, wherein
the treatment unit further includes a detector which determines whether a level of water in each of the treatment vessels lies within a normal range or not based on an index corresponding to a current value between the pair of electrodes, and
the water supplier includes a water supply pipe, and a switch which switches between a water supply operation of supplying water through the water supply pipe and a stop operation of stopping the water supply operation, the water supplier being configured to perform the stop operation if the detector detects that the current value between the pair of electrodes is higher than an upper limit value of a predetermined normal range during the water supply operation.

2. The water treatment device of claim 1, wherein during the ON operation, the power supply controller is configured to continue the ON operation if the detector detects that the current value between the pair of electrodes lies within a predetermined normal range, and execute the OFF operation if the detector detects that the current value between the pair of electrodes is out of the normal range.

3. The water treatment device of 1, wherein the draining member is configured to gradually drain water from each of the treatment vessels at all times.

4. The water treatment device of claim 1, wherein a tapered portion which is tapered upward is formed at an upper end of the divider.

5. The water treatment device of claim 1, further comprising:
a drain pipe provided only for one treatment vessel of the two treatment vessels, and includes an inlet located in the treatment vessel between a lower end of the electrode and an upper end of the divider and an outlet located under the water tank; and
a sump which collects water flowing from the outlet of the drain pipe.

6. A water treatment device, comprising:
a water tank which stores water;
an insulating divider which divides a space inside the water tank into two treatment vessels adjacent to each other in a horizontal direction, and includes a current carrier which is able to energize water in the two treatment vessels;
a treatment unit including a pair of electrodes arranged one each in each of the treatment vessels, a power supply which applies a voltage to the pair of electrodes, and a power supply controller which switches between an ON operation of keeping the power supply ON and an OFF operation of turning the power supply OFF;
a water supplier which supplies water to each of the treatment vessels; and
a draining member which drains water from each of the treatment vessels, wherein
the treatment unit further includes a detector which determines whether a level of water in each of the treatment vessels lies within a normal range or not based on an index corresponding to a current value between the pair of electrodes,
during the ON operation, the power supply controller is configured to continue the ON operation if the detector detects that the current value between the pair of electrodes lies within a predetermined normal range, and execute the OFF operation if the detector detects that the current value between the pair of electrodes is out of the normal range,
the current carrier is comprised of a small hole which allows the two treatment vessels to communicate with each other,
the treatment unit is comprised of a discharge unit which causes discharge inside the small hole, and
a lower end of each of the pair of electrodes is at a level higher than an upper end of the small hole.

7. A humidifier, comprising:
a passage forming member which forms an air passage; and
the water treatment device of claim 1, wherein
the draining member of the water treatment device is comprised of a water absorbing member including an immersed portion immersed in water in each of the treatment vessels, and a desorbing portion arranged in the air passage.

* * * * *